(12) United States Patent
Iwata et al.

(10) Patent No.: US 7,240,755 B2
(45) Date of Patent: Jul. 10, 2007

(54) ENGINE-SUPPORTING STRUCTURE FOR A MOTORCYCLE, AND METHODS OF USING SAME

(75) Inventors: Masayuki Iwata, Saitama (JP); Osamu Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 10/845,993

(22) Filed: May 14, 2004

(65) Prior Publication Data

US 2004/0238254 A1 Dec. 2, 2004

(30) Foreign Application Priority Data

May 30, 2003 (JP) ............................. 2003-155945
Jan. 15, 2004 (JP) ............................. 2004-007968

(51) Int. Cl.
*B62M 7/02* (2006.01)
(52) U.S. Cl. .................. 180/219; 180/291; 123/195 R; 411/150
(58) Field of Classification Search ................ 180/219, 180/228, 291; 411/371.2, 150, 546
See application file for complete search history.

(56) References Cited

U.S. PATENT DOCUMENTS

| | | | | |
|---|---|---|---|---|
| 2,778,399 A | * | 1/1957 | Mroz .......................... | 411/161 |
| 3,124,370 A | * | 3/1964 | Traugott .................. | 280/86.756 |
| 4,412,597 A | * | 11/1983 | Aiba .......................... | 180/228 |
| D276,309 S | * | 11/1984 | Frieberg ...................... | D8/399 |
| 5,232,056 A | * | 8/1993 | Long et al. .................. | 172/763 |
| 6,315,072 B1 | * | 11/2001 | Brown et al. ................ | 180/228 |
| 6,502,658 B1 | * | 1/2003 | Nagashii ...................... | 180/219 |
| 6,588,530 B2 | * | 7/2003 | Keller et al. ................. | 180/228 |
| 6,758,296 B2 | * | 7/2004 | Inaoka et al. ................ | 180/228 |

FOREIGN PATENT DOCUMENTS

JP 57-165827 10/1982
JP 03213482 9/1991

OTHER PUBLICATIONS www.engineersedge.com/hardness_conversion.htm, conversion table, whole table is pertinent.*

* cited by examiner

*Primary Examiner*—Christopher P. Ellis
*Assistant Examiner*—Vaughn Coolman
(74) *Attorney, Agent, or Firm*—Carrier Blackman & Associates, P.C.; William D. Blackman; Joseph P. Carrier

(57) ABSTRACT

An engine-supporting structure for a motorcycle, in which a collar can be removed to perform engine maintenance, and can be suitably re-mounted after the completion of maintenance. The engine-supporting structure supports a rear upper mounting portion of an engine, on left and right pivot plates, by providing left and right upper engine-supporting frame portions at central areas of the respective pivot plates. interposing a left upper collar between a left upper engine-supporting frame portion and a rear upper mounting portion formed on an engine, interposing a right upper collar between the right upper engine-supporting frame portion and the rear upper mounting portion formed on the engine, and coupling the left and right upper engine-supporting frame portions, the left and right upper collars, and the rear upper mounting portion by a rod-shaped member.

13 Claims, 24 Drawing Sheets

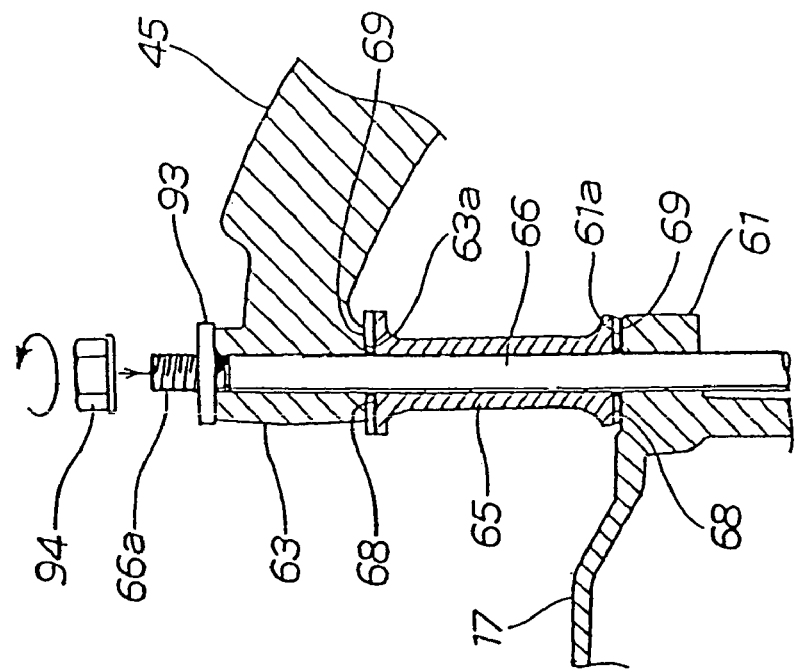
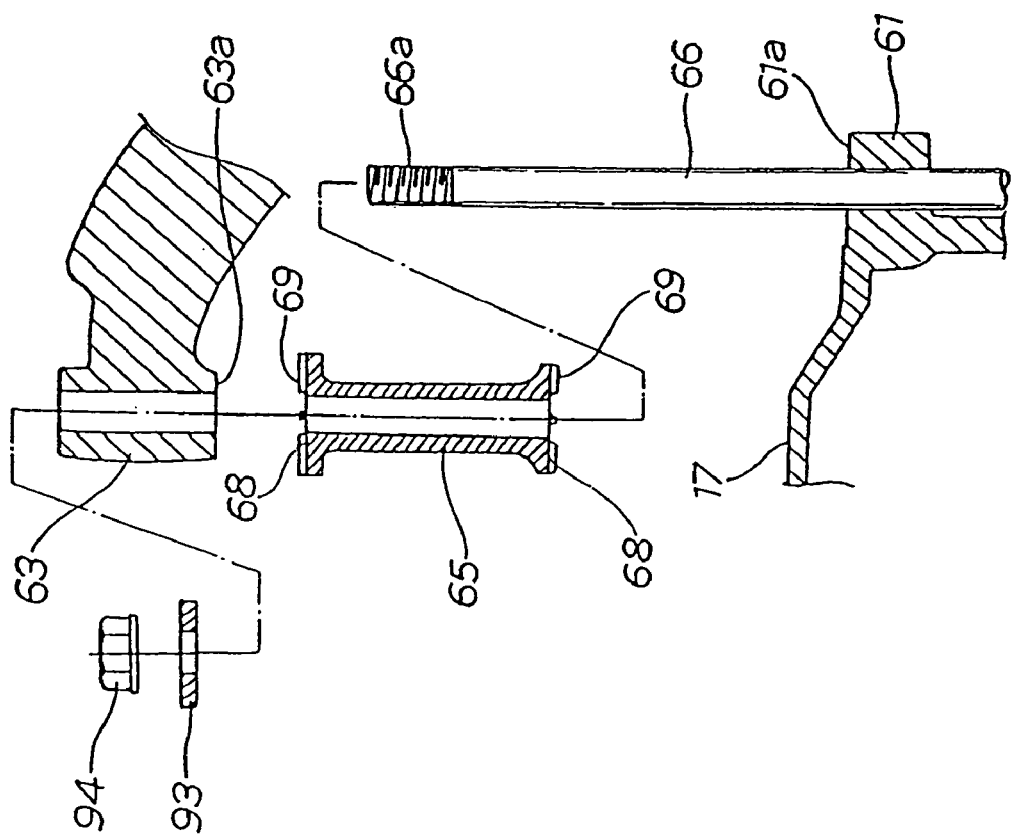
Fig. 11(a)
Fig. 11(b)

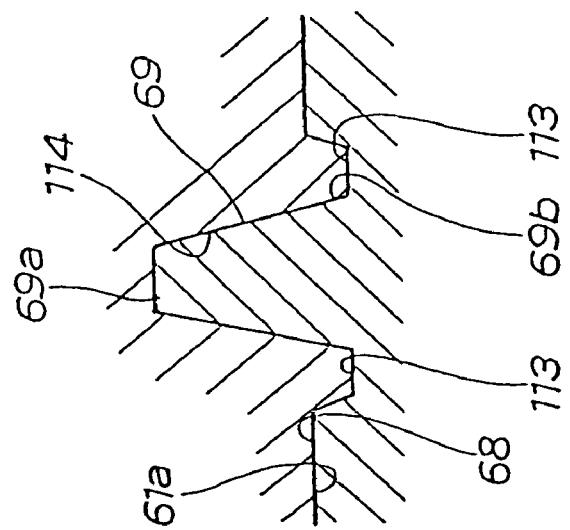
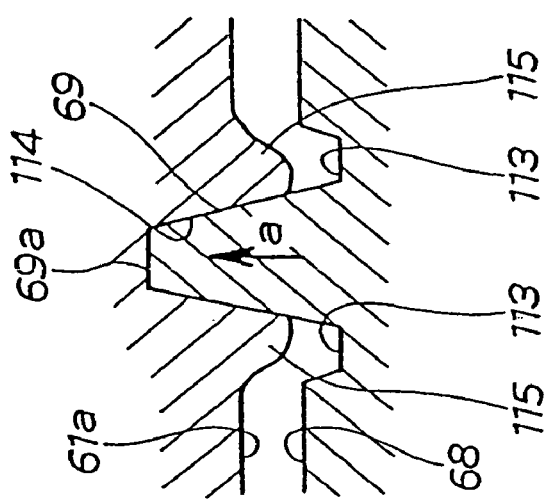
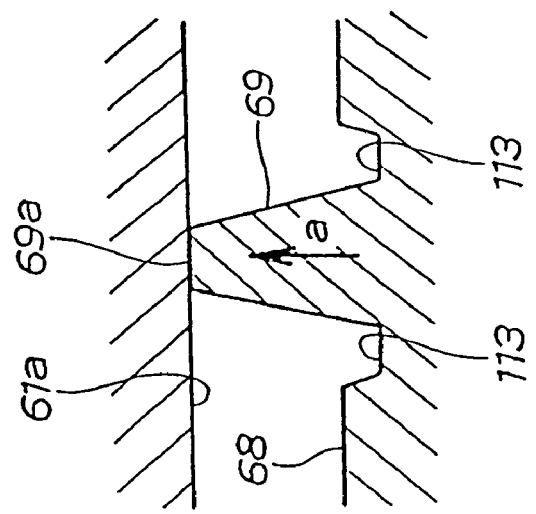
Fig. 12(c)
Fig. 12(b)
Fig. 12(a)

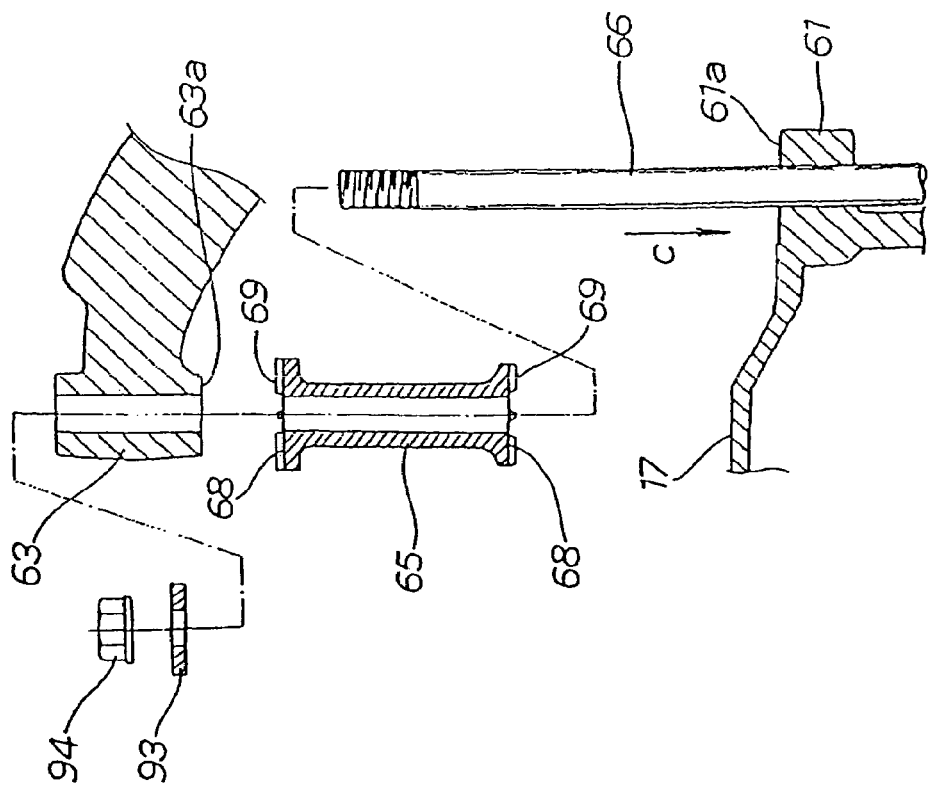
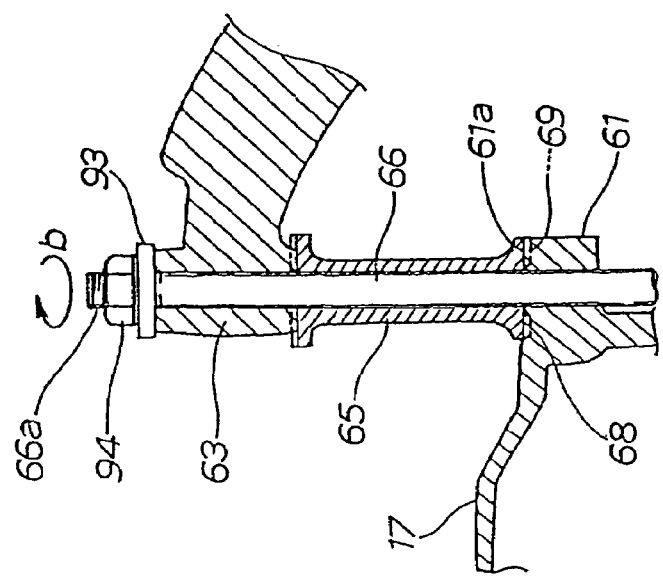
Fig. 13(a)
Fig. 13(b)

PRIOR ART

ENGINE-SUPPORTING STRUCTURE FOR A MOTORCYCLE, AND METHODS OF USING SAME

CROSS-REFERENCE TO RELATED APPLICATIONS

The present invention claims priority under 35 USC 119 based on Japanese patent application No. 2003-155945, filed May 30, 2003, and on Japanese patent application No. 2004-007968, filed Jan. 15, 2004.

BACKGROUND OF THE INVENTION

1. Field of the Invention

The present invention relates to an engine-supporting structure for a motorcycle, in which a collar is interposed between an engine and an engine-supporting frame portion of a vehicle body frame, and to methods of using the described engine-supporting structure to support the engine on the vehicle body frame, in which a rod-shaped member is used to interconnect the engine-supporting frame portion, the collar, and the engine.

2. Description of the Background Art

In some motorcycles, a method of supporting the engine on an engine-supporting frame portion on a vehicle body frame is known, in which a rod-shaped member, such as a bolt, is inserted into the engine-supporting frame portion, and the engine is held in place by tightening a nut onto an end portion of the rod-shaped member.

In some cases, when the engine is mounted on the engine-supporting frame portion, a gap is created between the engine-supporting frame portion and the engine, and a collar is interposed between the engine-supporting frame portion and the engine, in order to bridge the gap.

However, in this previously known approach, the collar is simply pressed against the engine-supporting frame portion and the engine, on the respective end surfaces thereof, by a tightening force of the nut, and hence, the collar may eventually slip in relation to the engine or to the engine-supporting frame portion.

When the collar according to the known design slips, the end surfaces of the collar may be displaced from the normal abutment position on the engine or on the engine-supporting frame portion.

As a countermeasure for preventing displacement of the end surfaces of the collar from the engine or the engine-supporting frame portion, there is a known method in which the end surfaces of the collar are formed with integral projections and recesses thereon, for engaging with the engine or the engine-supporting frame portion (for example, see Japanese patent publication JP-UM-A-57-165827).

FIG. 24 of the present application is a reproduced version of FIG. 3 from Japanese patent publication JP-UM-A-57-165827, and is included herein for discussion purposes. FIG. 24 is a side plan view, partially cut away and partially in cross-section, showing some prior art engine mounting hardware. In FIG. 24 of the present application, the components of the drawing have been renumbered from the numbering used in the original.

FIG. 25 of the present application is taken along the line 25—25 in FIG. 24, showing an example in which the plurality of claws 301, formed on the cylindrical body 300, are engaged with the shackle body 305.

According to JP-UM-A-57-165827, a number of claw-like serrations 301 are formed at the end of a cylindrical body 300, and valleys 302 are formed between adjacent claws 301, 301. In use, the cylindrical body 300 is fitted onto a shaft 303, the claws 301 of the cylindrical body 300 are brought into abutment against a shackle body 305, and a nut 307 is tightened on a screw portion 306 at the extremity of the shaft 303.

By tightening the nut 307, the claws 301 on the cylindrical body 300 can be brought into engagement with the shackle body 305. In this manner, the cylindrical body 300 can be integrally connected to the shackle body 305, and the cylindrical body 300 can be prevented from slipping with respect to the shackle body 305.

According to this approach, since the claws 301 are formed at the end of the cylindrical body 300 like serrations, the claws 301 are formed continuously along the peripheral wall of the cylindrical body 300. When the plurality of claws 301 are provided continuously, this may lead to the following difficulties:

Provision of the plurality of claws 301 on the cylindrical body 300 results in continuous engagement between the plurality of claws 301 and the shackle body 305. Therefore, a plurality of continuous indentations 309 is formed by engagement of the plurality of claws 301 with the shackle body 305.

Therefore, for example, when the cylindrical body 300 is dismounted, for example, for maintenance, and the cylindrical body 300 is re-mounted after maintenance is complete, there is no portion for engaging the plurality of claws 301 again remaining on the shackle body 305.

Therefore, the plurality of claws 301 cannot be suitably engaged with the shackle body 305 when re-mounting the cylindrical body 300.

Therefore, when re-mounting the cylindrical body 300, it is necessary to replace the shackle body 305 with a new one or repair it by bridging the indentations 309 on the shackle body 305, and then forming a flat portion on the shackle body 305.

In addition, since the claws 301 are continuously formed serrations on the cylindrical body 300, extremities of the claws 301 are pointed as shown in FIG. 25. Therefore, when allowing the claws 301 to engage with the shackle body 305, the extremities of the claws 301 tend to break easily.

Therefore, it is difficult to bring the claws 301 into suitable engagement with the shackle body 305 when re-mounting the cylindrical body 300.

Although the known inventions have some utility for their intended purposes, there is still a need to provide an improved engine-supporting structure for a vehicle. More particularly, there is a need for an improved engine-supporting structure for a vehicle which simplifies engine maintenance accessibility, and which facilitates re-mounting of a cylindrical body between an engine casing and an engine-supporting frame member.

SUMMARY OF THE INVENTION

Accordingly, it an object of the present invention to provide an engine-supporting structure for a motorcycle in which a collar, which has been dismounted for the purpose of maintenance, can be mounted easily again after completion of maintenance.

According to a first aspect thereof, the present invention provides an engine-supporting structure for a motorcycle, in which a collar is placed between the engine and an engine-supporting frame portion provided on the vehicle body frame. The engine-supporting frame portion, the collar, and the engine are interconnected by a rod-shaped member, and the collar is formed of material harder than the material of engine-supporting frame portion and the engine. The collar is provided with end surfaces each including flat surface sections, with a plurality of projections projecting outwardly from the flat surface sections, so that the projections engage the engine-supporting frame portion and/or the engine when the rod-shaped member is mounted.

By forming the collar of hard material, the projections formed on the collar side are allowed to engage the engine-supporting frame portion or the engine. As a consequence, the collar can be prevented from slipping.

In addition, since the projection is formed on the flat surface so as to protrude therefrom, the projections engage the engine-supporting frame portion and the engine, and then stops when the flat surface abuts against the engine-supporting frame portion and the engine. Therefore, the amount of engagement of the projection can be maintained at a suitable amount.

Furthermore, since the surfaces of the engine-supporting frame portion and the engine opposing the flat surface remain flat, the projections can engage the flat opposing surface when being set again. As a consequence, according to the first aspect hereof, the collar can be mounted again and again.

A second aspect of the present invention is characterized in that the projections on the ends of the collar are each formed with a trapezoidal cross section.

Since the extremities of the projections are sharply pointed, the extremities of the projections are projected to be crushed gradually after repeated mounting of the collar. When the extremities are crushed, the state of engagement becomes unstable, and then the shape of indentations formed on the side of the engine-supporting frame portion or the engine becomes irregular.

Therefore, in the second aspect hereof the extremities, that is the apexes of the projections are flattened. Consequently, crushing of the apexes is solved, and hence the shapes of the indentations formed on the side of the engine-supporting frame portion or the engine are stabilized.

More specifically, the apexes of the projections are made to resist crushing, by forming the projections with a trapezoidal cross section. Therefore, the collar-abutting portion may be subjected to plastic deformation by the projections, so that the projections can engage the collar-abutting portion without crushing the projection apexes.

Accordingly, for example, when the collar is dismounted for the purpose of maintenance, and then the collar is re-mounted after completion of maintenance, the projections on the end surface of the collar are allowed to suitably engage the collar-abutting portion.

A third aspect of the present invention is characterized in that the collar end surface is formed with grooves formed therein in the proximity of the projections.

When the projections are allowed to engage with the engine-supporting frame portion of the engine, so-called fluidizing phenomenon of the wall occurs, and the edges of the indentations formed on the engine-supporting frame portion or the engine protrude toward the collar. When such protrusions exist, the collar can hardly be brought into close contact with the engine-supporting frame portion or the engine.

A fourth aspect of the present invention is characterized in that the projections are radial ridges extended from the center of the collar in the radial directions.

Since the projections are radial ridges, a simple structure is achieved, and hence manufacturing is facilitated and designing is also facilitated.

In addition, by forming the projections into the radial ridges, the projections are disposed in the direction orthogonal to the circumference of the end surface of the collar, and the projections are elongated in the radial directions.

Therefore, a force to attempt to rotate the collar can be received efficiently by the projections.

A fifth aspect of the present invention is characterized in that the projection is an eccentric ridge which is off-center with respect to the center of the collar.

By forming the projection into an eccentric circular ridge which is off-center with respect to the center of the collar, the projection of a continuous shape is achieved.

Therefore, when machining the projections with a cutting tool, the cutting tool can easily be controlled and machining of the projections can be performed easily.

A sixth aspect of the present invention is characterized in that the projection is an oval-shaped ridge.

By forming the projection into an oval-shaped ridge, the projection of a continuous shape is achieved. Therefore, when machining the projection with a cutting tool, the cutting tool can easily be controlled and machining of the projection can be performed easily.

According to the first aspect of the invention, the projections are allowed to suitably engage the collar-abutting portion when the collar is re-mounted and hence the labor to repair the collar-abutting portion and form a flat surface can be saved advantageously by preventing the collar from slipping, maintaining the amount of engagement of the projection at a suitable amount, and enabling repetitive mounting of the collar.

According to the second aspect of the invention, the necessity of replacing the collar when mounting the collar again is advantageously avoided by allowing the projections to engage the collar-abutting portion without crushing the extremities (apexes) thereof.

According to the third aspect of the invention, further stable fixation of the collar to the collar-abutting portion is advantageously ensured by accommodating the protrusions generated around the indentations when the projections are engaged with the collar-abutting portion in the grooves formed at the portions in the proximity of the projections and bringing the flat surface of the end surface of the collar into close contact with the collar-abutting portions.

According to the fourth aspect of the invention, since the projections are the radial ridges of a simple structure, advantageously, manufacturing can be facilitated and designing can also be facilitated.

In addition, the force to attempt to rotate the collar can be received efficiently by forming the projections into radial ridges and hence further stable fixation of the collar to the collar-abutting portion is advantageously ensured.

According to the fifth aspect of the invention, control of the cutting tool during machining can be simplified and hence machining of the projection can advantageously be made easily by forming the projection into an eccentric circular ridge of a continuous shape.

According to the sixth aspect of the invention, control of the cutting tool during machining can be simplified and machining of the projection can easily be performed by forming the projection into an oval-shaped ridge of a continuous shape.

For a more complete understanding of the present invention, the reader is referred to the following detailed description section, which should be read in conjunction with the accompanying drawings. Throughout the following drawings, like numbers refer to like parts.

BRIEF DESCRIPTION OF THE DRAWINGS

FIGS. 11(a) and 11(b) are first explanatory drawings showing an operation of the engine-supporting structure for a motorcycle according to an embodiment of the present invention, in which FIG. 11(a) is an exploded view, and FIG. 11(b) is an assembled view.

FIGS. 12(a)–(c) are second explanatory drawings showing the operation of the engine-supporting structure for a motorcycle according to the present invention.

FIGS. 13(a) and (b) are third explanatory drawings showing the operation of the engine-supporting structure for a motorcycle according to an embodiment of the present invention.

DETAILED DESCRIPTION

Figure 1:
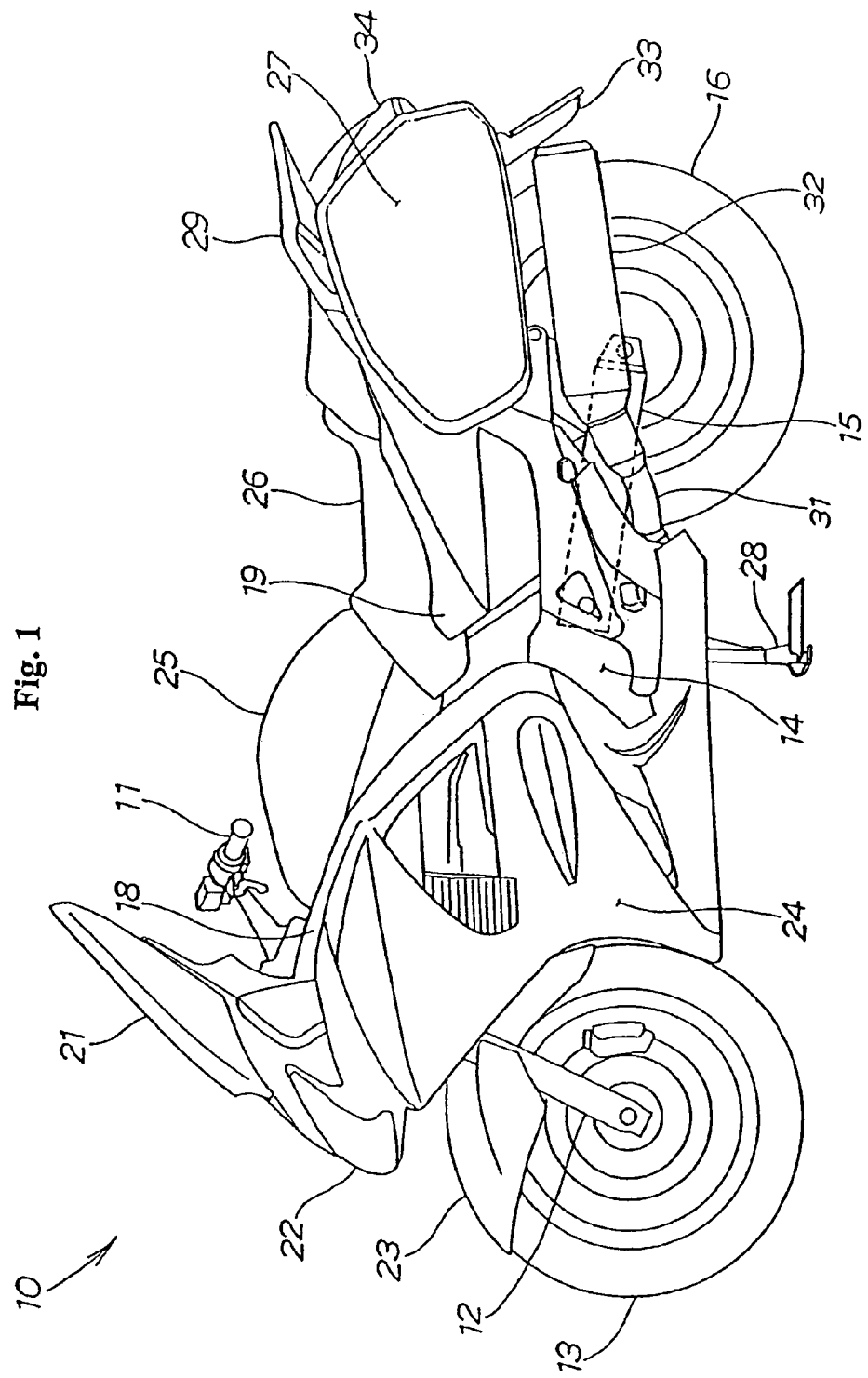
FIG. 1 is a side plan view of a motorcycle in which an engine-supporting structure according to an embodiment of the present invention is employed.

Referring now to the accompanying drawings, a number of selected illustrative embodiments of the present invention will be described below. In the drawings, the terms "front", "rear", "left" and "right" represent directions viewed from the vantage point of a driver seated on the motorcycle and facing forward.

FIG. 1 is a side plan view of a motorcycle 10, in which an engine-supporting structure according to a selected illustrative embodiment of the present invention is employed.

The motorcycle 10 is a vehicle in which a handlebar 11, a front fork 12, and a front wheel 13 to be steered by the handlebar 11 are disposed at the front of the vehicle body, and a vehicle body frame 14 is disposed extending from the front portion 18 of the vehicle body. An engine 17 (see FIG. 2) is mounted to the vehicle body frame 14, in a manner to be described in further detail below. A swing arm 15 is mounted to the lower portion of the vehicle body frame 14 so as to be capable of a swinging motion, and a rear wheel 16 is mounted to the rear end of the swing arm 15.

In the drawing, reference numeral 21 designates a wind screen, 22 designates a headlamp, 23 designates a front fender, 24 designates a cowling, 25 designates a fuel tank, 26 designates a seat, 27 designates a luggage box, 28 designates a stand, 29 designates a grab rail, 31 designates an exhaust pipe, 32 designates a muffler, 33 designates a rear fender, and 34 designates a tail lamp.

Figure 2:
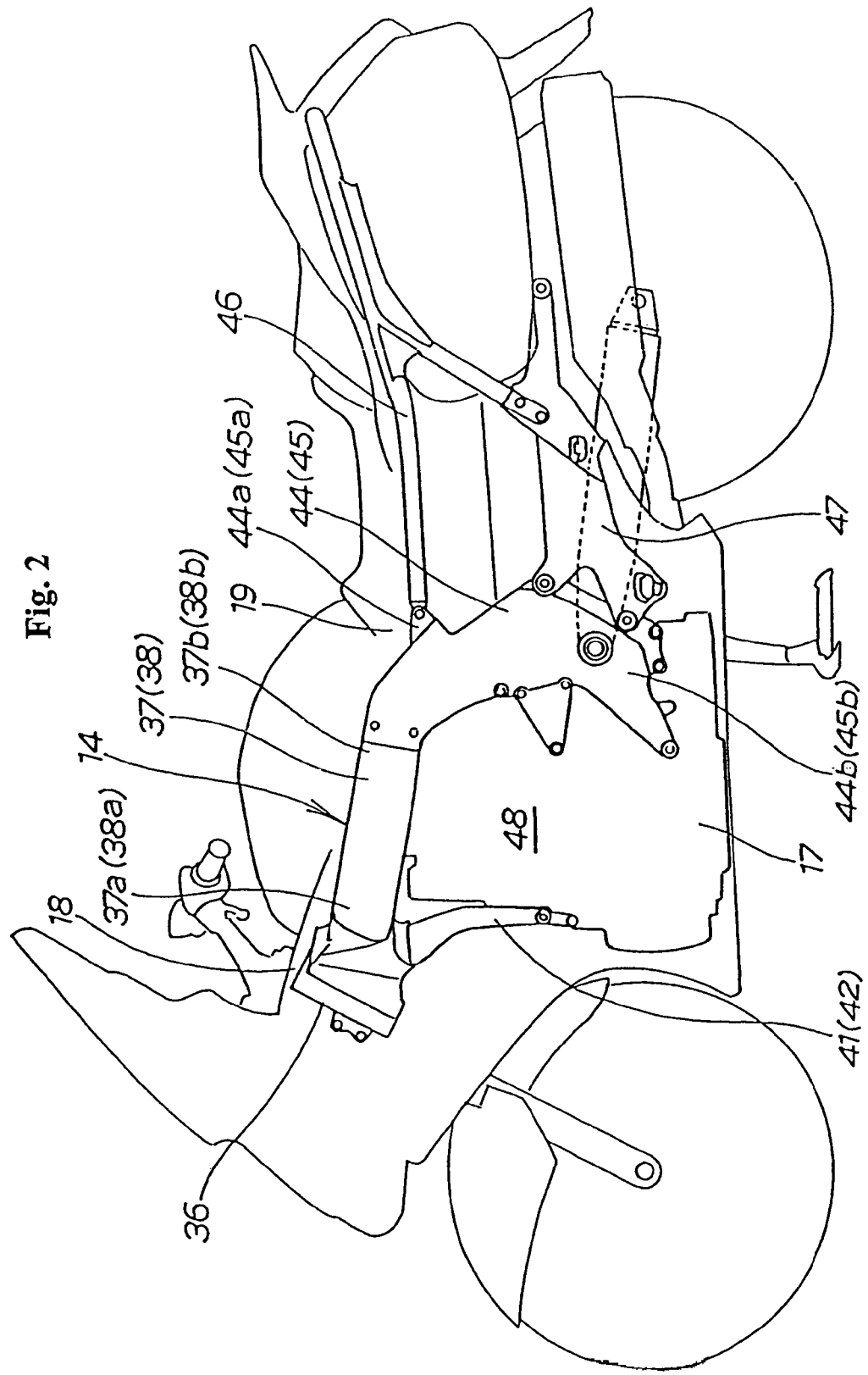
FIG. 2 is a simplified side plan view of the motorcycle of FIG. 1, showing a state in which an engine-supporting structure is mounted into the motorcycle according to an embodiment of the present invention.

FIG. 2 is a simplified side plan view of the motorcycle 10, showing a state in which an engine-supporting structure is assembled into the motorcycle according to a first aspect of the present invention.

The vehicle body frame 14, being disposed from the front portion 18 of the vehicle body to the center portion 19 of the vehicle body, includes left and right main pipes 37, 38 extended rearward in a downward pitch from the head pipe 36, left and right down pipes 41, 42 extended downward from the front portions 37a, 38a of the main pipes 37, 38 and the head pipe 36, and left and right pivot plates 44, 45 joined to the rear portions 37b, 38b of the left and right main pipes 37, 38 respectively.

The engine 17 is provided in a space 48 defined by the left and right main pipes 37, 38 the left and right pivot plates 44, 45, and the left and right down pipes 41, 42 of the vehicle body frame 14.

A rear frame 46 is attached to the upper rear ends 44a, 45a of the left and right pivot plates 44, 45 and a step holder 47 is attached to the rear ends 44b, 45b of the lower portions of the left and right pivot plates 44, 45.

Figure 3:
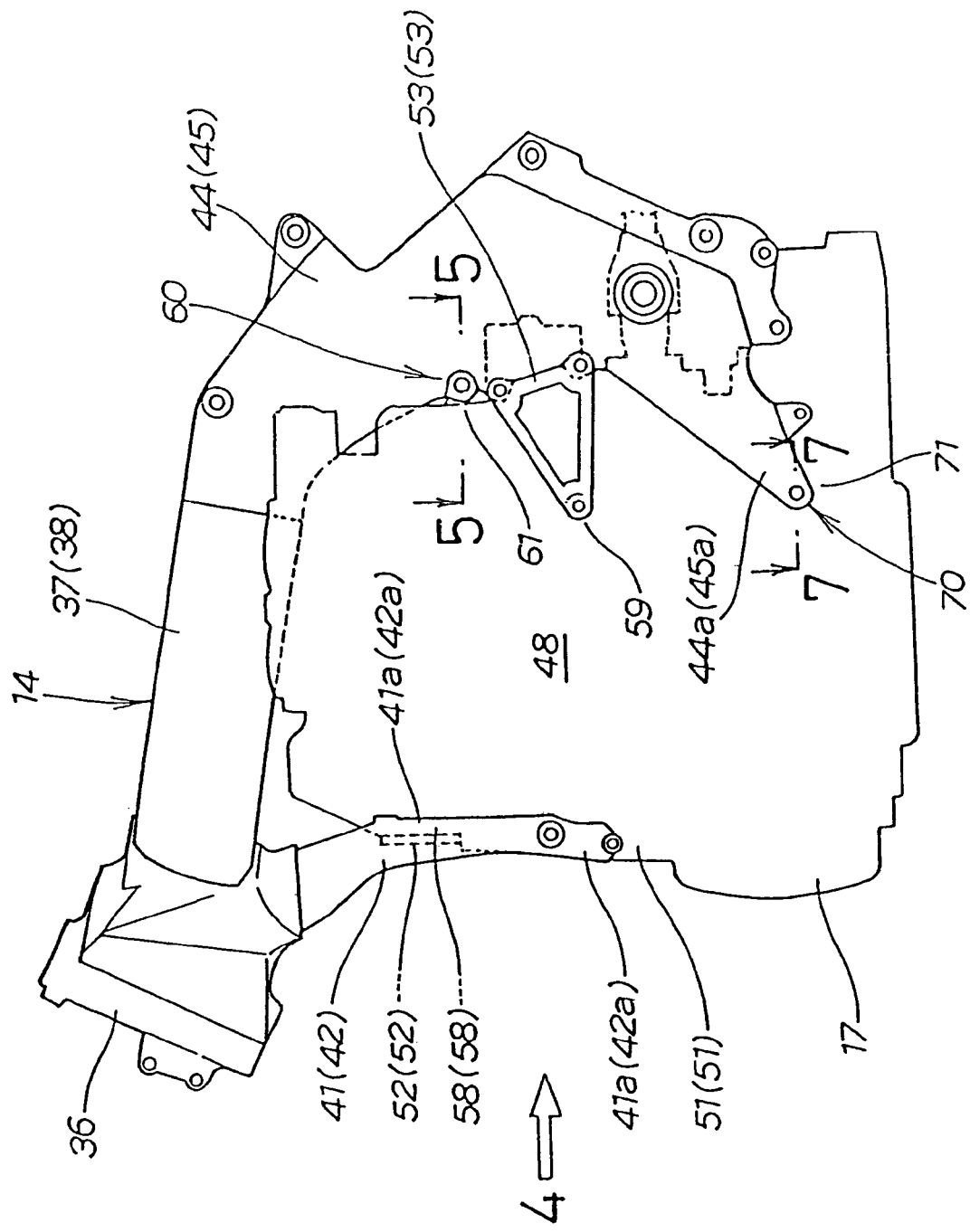
FIG. 3 is a side view showing a state in which the engine is supported by the engine-supporting structure according to an embodiment of the present invention.

FIG. 3 is a side plan view of the engine 17 and part of the frame 14, showing the engine supported in the engine-supporting structure according to the first aspect of the present invention.

The front mounting portions 51, 51 of the engine 17 are attached to the lower ends 41a, 42a of the left and right down pipes 41, 42 respectively.

Front mounting brackets 52, 52 (see also FIG. 4) are attached to the centers 41a, 42a of the left and right down pipes 41, 42 respectively and the front central mounting portions 58, 58 of the engine 17 are attached to the respective front mounting brackets 52, 52.

Rear mounting brackets 53, 53 are attached to the centers of the left and right pivot plates 44, 45 respectively, and the rear central mounting portion 59 of the engine 17 is attached to the respective rear mounting brackets 53, 53.

An upper engine-supporting structure 60 is provided as the engine-supporting structure for a motorcycle on the pivot plates 44, 45 located above the left and right rear mounting brackets 53, 53. The rear upper mounting portions 61 of the engine 17 are mounted via the upper engine-supporting structure 60.

A lower engine-supporting structure 70 is provided as the engine-supporting structure for a motorcycle at the lower ends 44a, 45a of the respective left and right pivot plates 44, 45. The rear lower mounting portion 71 of the engine 17 is mounted via the lower engine-supporting structure 70.

Accordingly, the engine 17 can be mounted at a space 48 defined by the left and right main pipes 37, 38, the left and right pivot plates 44, 45, and the left and right down pipes 41, 42 of the vehicle body frame 14.

The upper and the lower engine-supporting structures 60, 70 will be described below.

Figure 4:
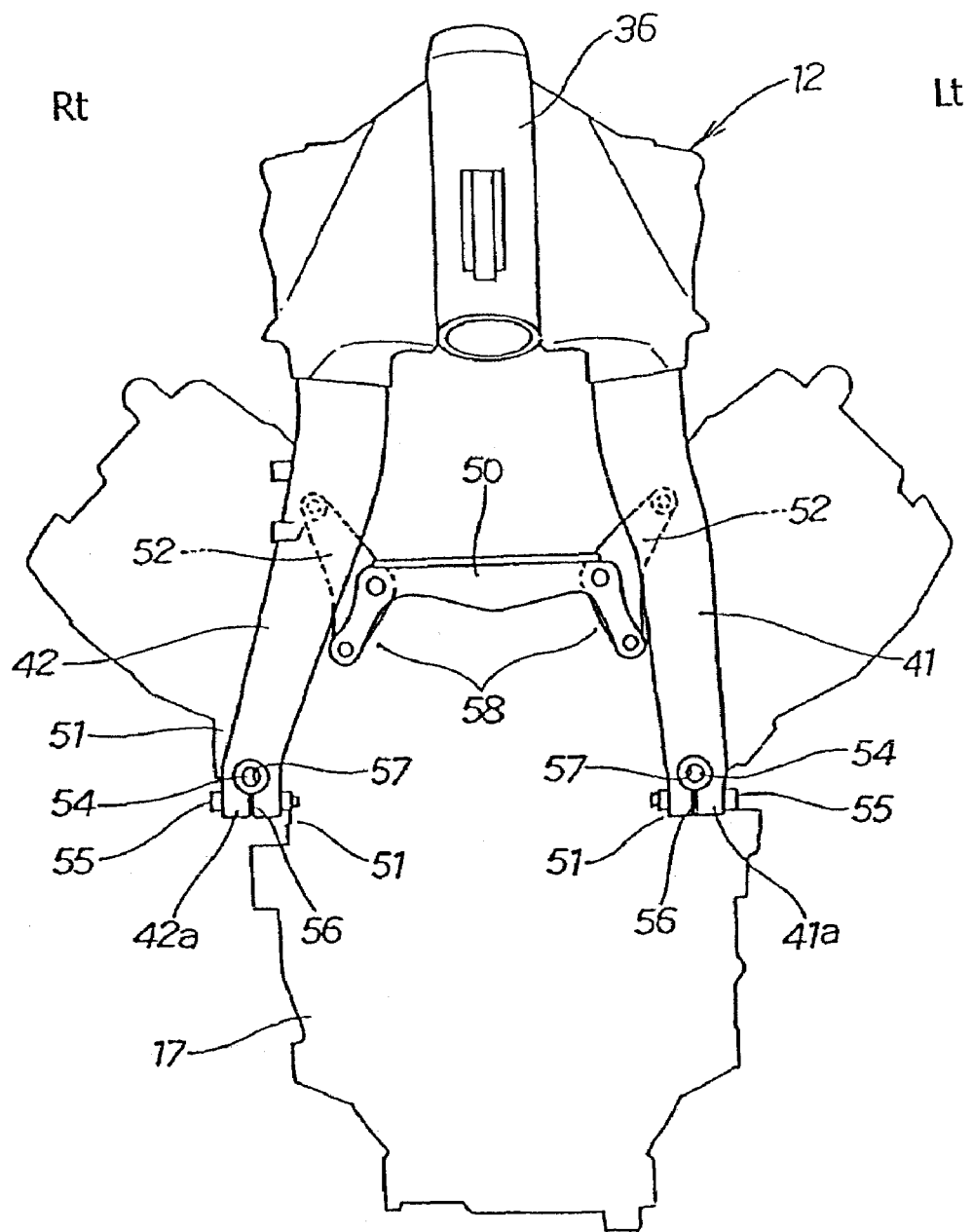
FIG. 4 is a front view showing a state in which the engine is supported by the engine-supporting structure according to an embodiment of the present invention.

FIG. 4 is a front view showing a state in which the engine is supported by the engine-supporting structure according to an embodiment of the present invention.

Mounting holes 57, 57 are formed at the lower ends 41a, 42a of the respective left and right down pipes 41, 42, and mounting members 54, 54 for mounting the engine 17 are inserted into the mounting holes 57, 57. In this state, the mounting members 54, 54 are fixed to the mounting holes 57, 57 by narrowing the gaps of the slits 56, 56 by tightening the bolts 55, 55. The front mounting portions 51, 51 of the engine 17 are mounted by split-clamping.

The front mounting brackets 52, 52 are attached respectively at the centers of the left and right down pipes 41, 42, and the front central mounting portions 58, 58 of the engine 17 are attached to the respective front mounting brackets 52, 52.

In this case, the left and right down pipes 41, 42 are reinforced by interposing a cross member 50 between the left and right front mounting brackets 52, 52 and the front central mounting portions 58, 58 of the engine 17.

Figure 5:
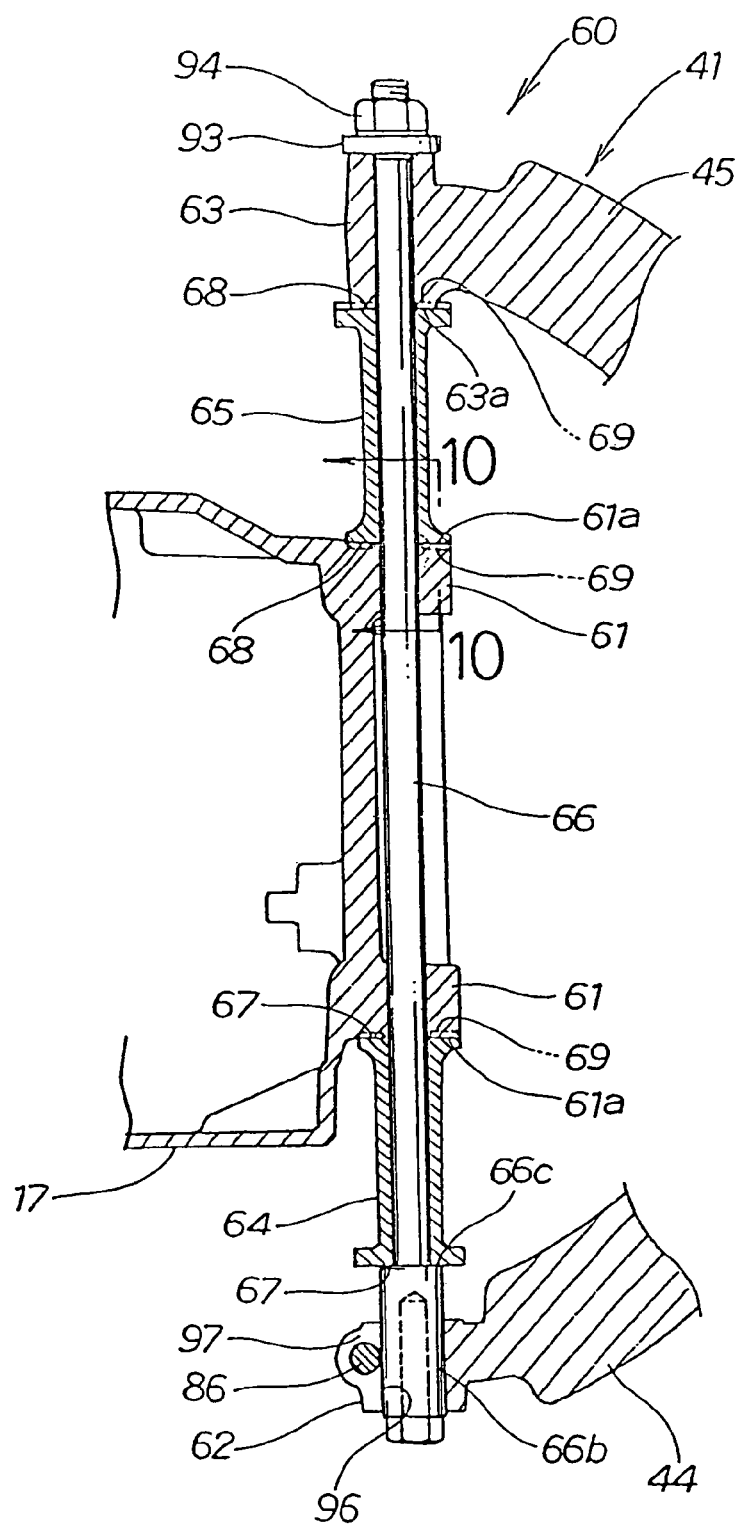
FIG. 5 is a cross sectional view of selected parts of the engine support structure hereof, taken along the line 5—5 in FIG. 3 according to an embodiment of the present invention.

FIG. 5 is a cross sectional view of the engine support structure 60 hereof, taken along the line 5—5 in FIG. 3.

The upper engine-supporting structure 60 supports the rear upper mounting portion 61 of the engine 17 at the centers of the left and right pivot plates 44, 45 by providing left and right upper engine-supporting frame portions 62, 63 respectively and substantially at the centers of the left and right pivot plates 44, 45 (vehicle body frame 14), interposing a left upper collar 64 between the left upper engine-supporting frame portion 62 and the rear upper mounting portion 61 formed on the engine 17, interposing a right upper collar 65 between the right upper engine-supporting frame portion 63 and the rear upper mounting portion 61 formed on the engine 17, and coupling the left and right upper engine-supporting frame portions 62, 63, the left and right upper collars 64, 65, and the rear upper mounting portion 61 by a relatively long rod-shaped member 66.

The upper engine-supporting structure 60 includes the left and right upper collars, 64, 65, and these collars are formed of material harder than the material of the left and right upper engine-supporting frame portions 62, 63 and the rear upper mounting portion 61 of the engine 17. The collars 64, 65 include special three-dimensionally configured end surfaces 67, 67, 68, 68 formed integrally thereon (hereinafter referred to as "end surfaces of the left and right upper collars"). The end surfaces 67, 67, 68, 68 of the left and right upper collars 64, 65 include selected areas formed into flat surfaces, as well as projections 69 (see also FIGS. 9(a)–9(b)) protruding outwardly therefrom. The projections 69 engage the right upper engine-supporting frame portion 63 and the rear upper mounting portions 61, 61 of the engine 17 when mounting the rod-shaped member 66.

The left and right upper collars 64, 65 are members formed by machining, for example S35C–S50C, more specifically, S35C, S48C, and S50C.

The collars 64, 65 are of 212–277 in Brinell hardness ($H_B$).

The collars 64, 65 may be formed by sintering metal, and the collars of such sintered metal may have hardness harder than S50C, for example.

The left and right upper engine-supporting frame portions 62, 63 are, for example, formed of aluminum casting.

The rear upper mounting portion 61 of the engine 17 is, for example, formed of aluminum casting like the left and right upper engine-supporting frame portions 62, 63.

The left and right upper engine-supporting frame portions 62, 63 and the rear upper mounting portion 61 of the engine 17 are, for example, of about 100 in Brinell hardness ($H_B$).

Therefore, the projections 69 of the end surfaces 67, 68 of the collars are allowed to engage the rear upper mounting portions 61, 61 of the left upper engine-supporting frame portion 62 and the rear upper mounting portions 61, 61 of the engine 17.

The end surface 67 of the left upper collar 64, facing the left upper engine-supporting frame portion, is not formed with the projections 69. The reason is described below.

The right upper collar 65 of the upper engine-supporting structure 60 will be described in conjunction with FIG. 6 below.

Figure 6:
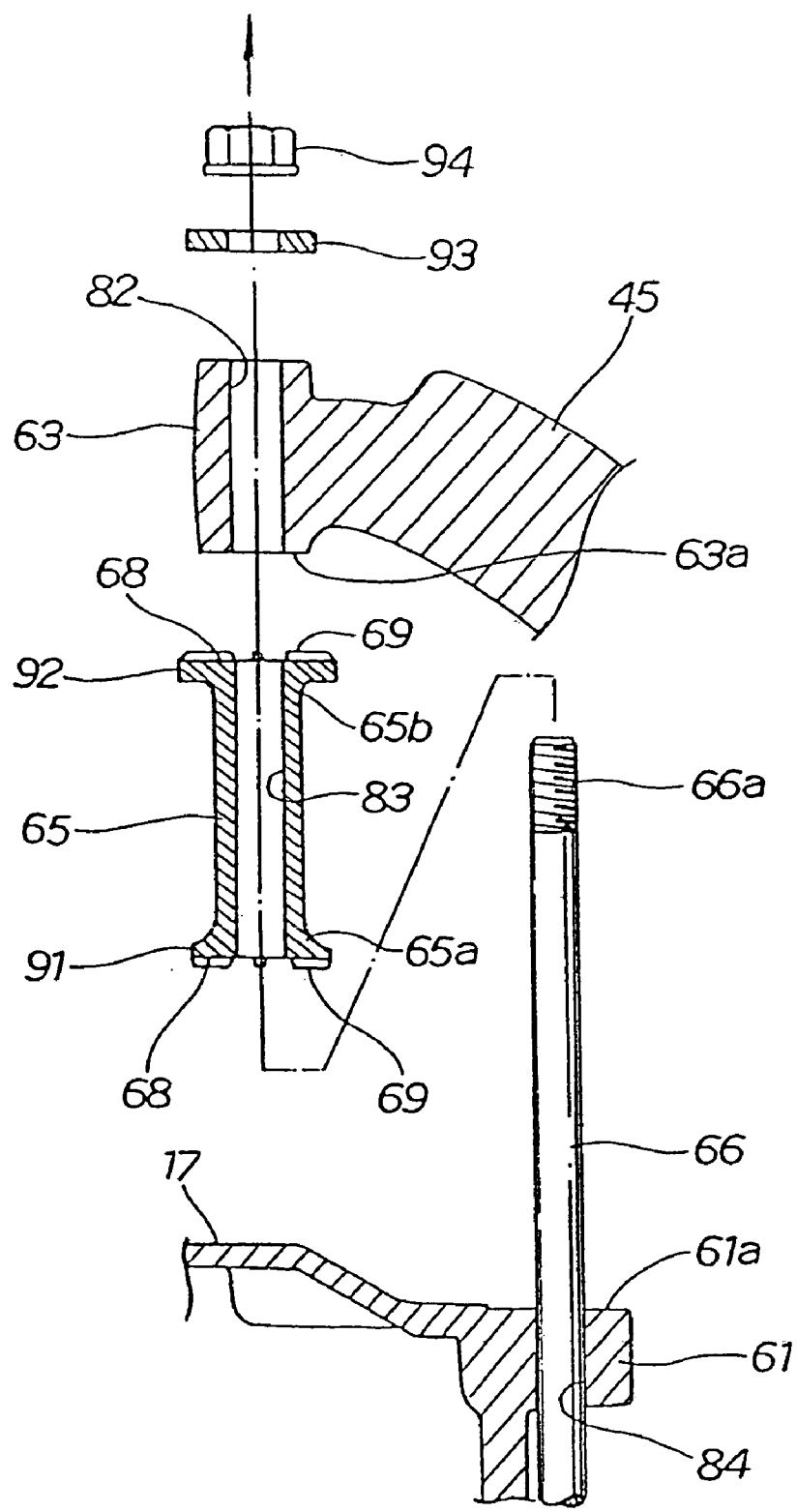
FIG. 6 is an explanatory drawing showing the relative mounting state of the right upper collar which constitutes part of the upper engine-supporting structure according to an embodiment of the present invention.

FIG. 6 is an explanatory drawing showing the relative mounting state of the right upper collar which constitutes part of the upper engine-supporting structure according to the present invention.

The right upper collar 65 is a cylindrical member formed with the inner and outer flanges 91, 92 respectively at the inner and outer end portions 65*a*, 65*b*, and the projections 69 are formed on the end surface 68 of the inner flange 91 (that is, the end surface of the inner upper collar) so as to protrude therefrom, and the projection 69 formed on the end surface 68 of the outer flange 92 (that is, the end surface of the outer upper collar) so as to protrude therefrom.

The right upper collar 65 is interposed between the right upper engine-supporting frame portion 63 and the rear upper mounting portion 61 of the engine 17, and the rod-shaped member 66 is inserted through a through-hole 82 on the right upper engine-supporting frame portion 63, a through-hole 83 on the right upper collar 65, and a through-hole 84 on the rear upper mounting portion 61 of the engine 17, respectively, so that the screw portion 66*a* of the rod-shaped member 66 is projected from the right upper engine-supporting frame portion 63.

A washer 93 is fitted on the screw portion 66*a* projected from the right upper engine-supporting frame portion 63, and a nut 94 is screwed onto the screw portion 66*a* from the outside of the washer 93.

By pressing the end surface 68 of the inner upper collar on the inner side against the collar-abutting portion 61*a* of the rear upper mounting portion 61 of the engine 17, the projections 69 formed on the end surface 68 of the inner upper collar are allowed to engage the collar-abutting portion 61*a* of the engine upper mounting portion.

At the same time, by pressing the end surface 68 of the outer upper collar against the collar-abutting portion 63*a* of the right upper engine-supporting frame portion 63, the projections 69, formed on the end surface 68 of the outer upper collar, are allowed to engage the collar-abutting portion 63*a* of the pivot plate.

Accordingly, the right upper collar 65 is prevented from slipping with respect to the right upper engine-supporting frame portion 63 or the rear upper mounting portion 61 of the engine 17, when interposing the right upper collar 65 therebetween.

Referring back to FIG. 5, a method of mounting a connecting member 66 to the left upper engine-supporting frame portion 62 of the pivot plate will be described. A mounting hole 96 is formed on the left upper engine-supporting frame portion 62, and a slit 97 is formed at the mounting hole 96. In a state in which an enlarged head 66*b* of the connecting member 66 is inserted into the mounting hole 96, a bolt 86 is tightened so that the gap of the slit 97 is narrowed to fix the enlarged head 66*b* into the mounting hole 96.

The connecting member 66 has a member having substantially the same hardness as the left upper collar 64, for example, a steel member, and it is difficult to allow the projections 69 of the end surface 67 of the left upper collar to engage the collar-abutting portion 66*c* of the connecting member 66.

Therefore, the end surface 67 of the left upper collar, which abuts against the collar-abutting portion 66*c* of the connecting member 66, is not formed with the projections 69 thereon.

Therefore, the end surface 67 of the left upper collar, which is formed entirely as a flat surface, is brought into abutment with the collar-abutting portion 66*c* of the connecting member 66. In this case, by allowing the projections 69 formed on the end surface 67 of the left upper collar on the other hand to engage the collar-abutting portion 61*a* of the engine rear upper mounting portion 61, the left upper collar 64 is prevented from slipping, with respect to the left upper engine-supporting frame portion 62 of the pivot plate 44 and the rear upper mounting portion 61 of the engine 17.

Figure 7:
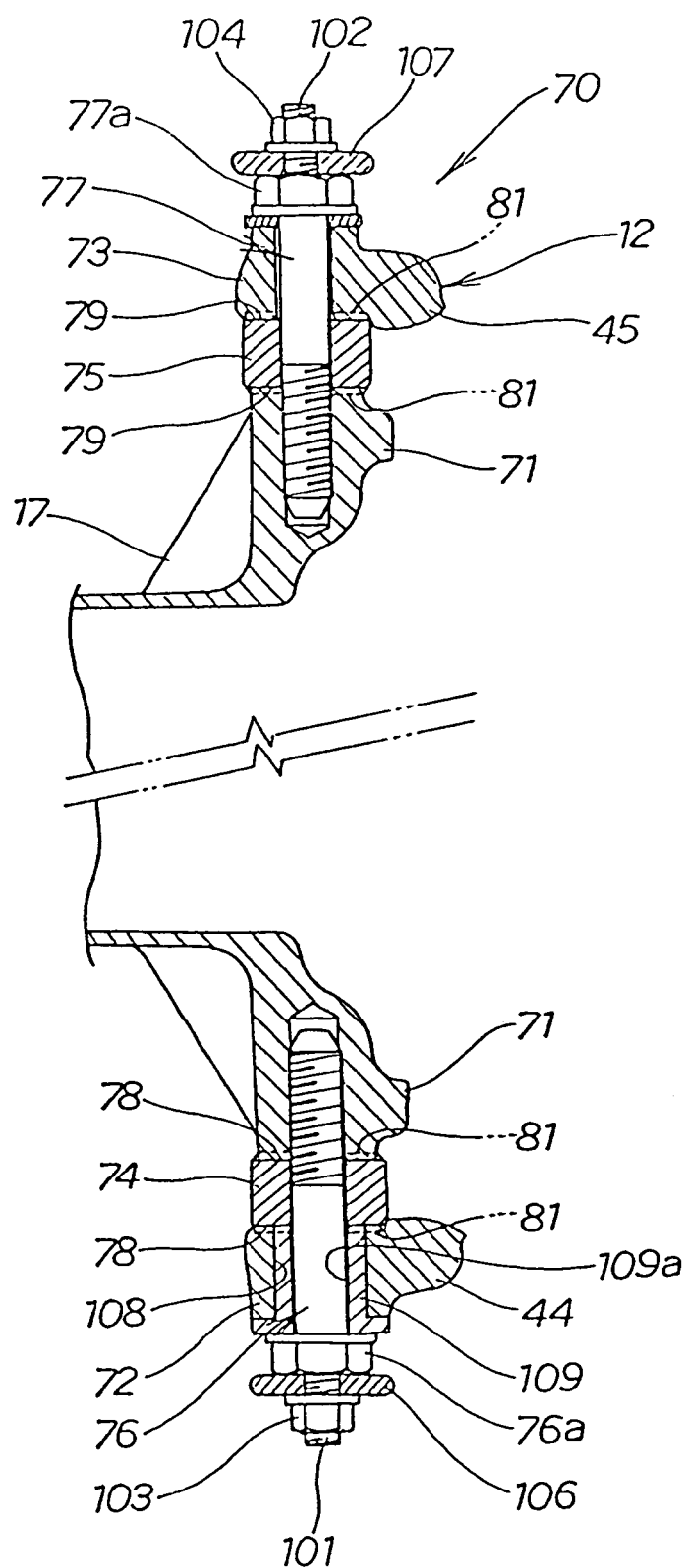
FIG. 7 is a cross sectional view taken along the line 7—7 in FIG. 3 according to an embodiment of the present invention.

FIG. 7 is a cross sectional view taken along the line 7—7 in FIG. 3, showing the lower engine-supporting structure 70.

The lower engine-supporting structure 70 supports the rear lower mounting portion 71 of the engine 17 by providing left and right lower engine-supporting frame portions 72, 73 at the lower ends of the left and right pivot plates 44, 45 (the vehicle body frame 12) respectively, interposing the left lower collar 74 between the left lower engine-supporting frame portion 72 and the rear lower mounting portion 71 of the engine 17, inserting the left supporting bolt (rod-shaped member) 76 through the left lower engine-supporting frame portion 72, the left lower collar 74, and the rear lower mounting portion 71 of the engine 17, interposing the right lower collar 75 between the right lower engine-supporting frame portion 73 and the rear lower mounting portion 71 of the engine 17, and coupling the right lower engine-supporting frame portion 73, the right lower collar 74, and the rear lower mounting portion 71 of the engine 17 by the right supporting bolt (rod-shaped member) 77.

The lower engine-supporting structure 70 includes the left and right lower collars 74, 75 formed of material harder than the left and right lower engine-supporting frame portions 72, 73 and the rear lower mounting portion 71 of the engine 17, the end surfaces (hereinafter, referred to as "end surfaces of the left and right lower collars") 78, 79 of the left and right lower collars 74, 75 being formed into three-dimensional contoured shapes including flat surfaces, the projections 81 (see also FIG. 8) being formed on the flat end surfaces 78, 79 of the left and right lower collars so as to protrude therefrom, so that the projections 81 engage the left and right lower engine-supporting frame portions 72, 73 and the rear lower mounting portion 71 of the engine 17 when mounting the left and right supporting bolts 76, 77.

The left and right collars 74, 75 are members formed by machining, for example, S35C–S50C, more specifically, S35C, S48C, and S50C.

The collars 74, 75 are of 212–277 in Brinell hardness ($H_B$).

The collars 74, 75 may be formed by sintered metal, and the collars of such sintered metal may have hardness harder than S50C, for example.

The left and right lower engine-supporting frame portions 72, 73 are, for example, formed of aluminum casting.

The rear lower mounting portion 71 of the engine 17 is, for example, formed of aluminum casting like the left and right lower engine-supporting frame portions 72, 73.

The left and right lower engine-supporting frame portions 72, 73 and the rear lower mounting portion 71 of the engine 17 are, for example, of about 100 in Brinell hardness ($H_B$).

Therefore, the projections 81 of the end surfaces 78, 79 of the collars are allowed to engage and form indentations in the left and right engine-supporting frame portion 72, 73 and the rear lower mounting portion 71 of the engine 17.

Left and right screw portions 101, 102 are concentrically fixed to heads 76*a*, 77*a* of the left and right supporting bolts 76, 77. By screwing a left nut 103 onto the left screw portion 101, a left stay 106 of an engine guard is clamped between the head 76a and the left nut 103.

By screwing a right nut 104 onto the right screw portion 102, a right stay 107 of the engine guard is clamped between the head 77a and the right nut 104.

Subsequently, the right lower collar 75 of the lower engine-supporting structure 70 will be described in conjunction with the next drawing.

Figure 8:
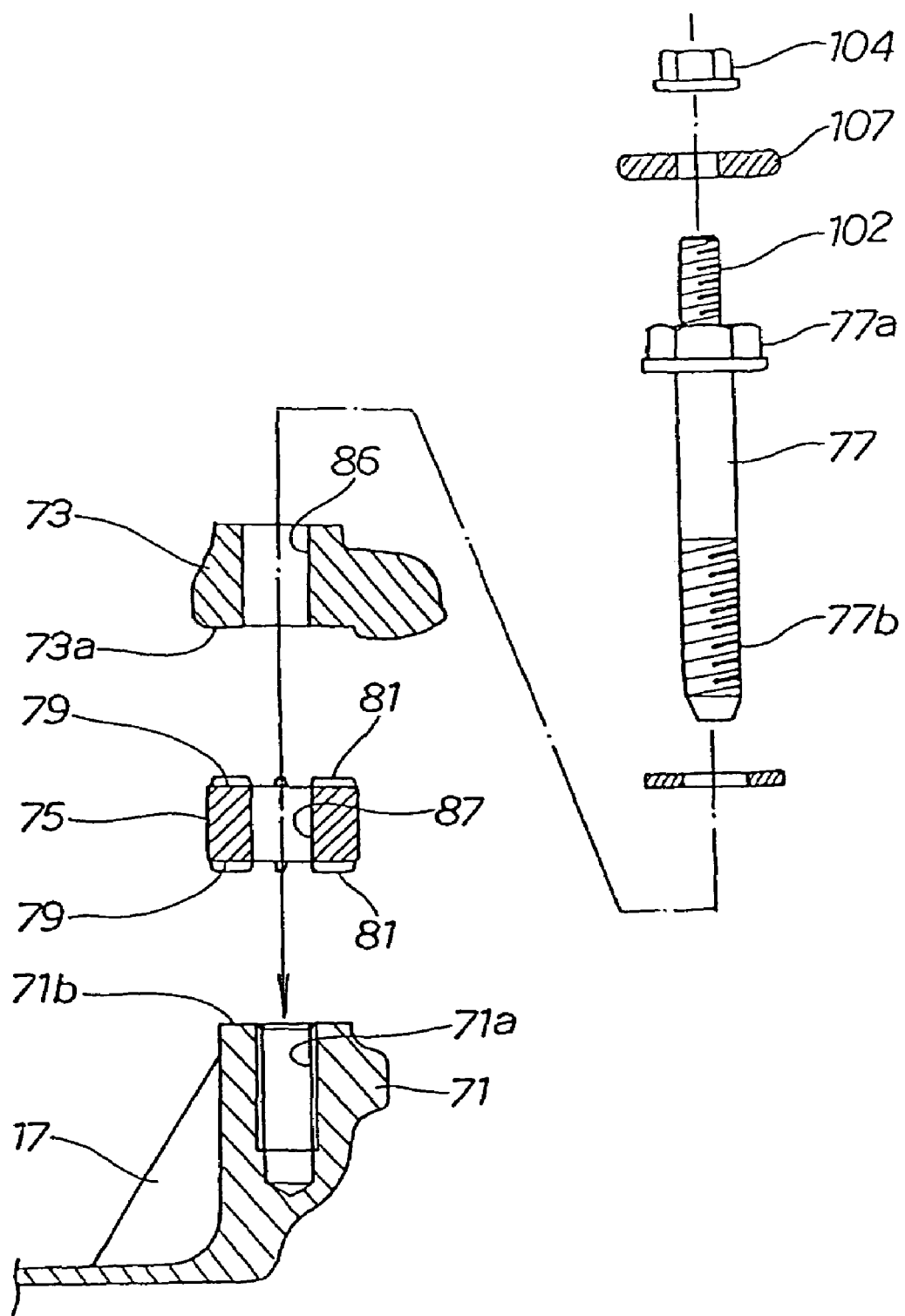
FIG. 8 is an explanatory drawing of the relative mounting state of the right lower collar which constitutes part of the lower engine-supporting structure according to an embodiment of the present invention.

FIG. 8 is an explanatory drawing of the relative mounting state of the right lower collar which constitutes part of the lower engine-supporting structure according to the present invention.

The right lower collar 75 is a cylindrical member formed with projections 81 on the inner and outer end surfaces 79, 79 (that is, the end surfaces of the inner and outer upper collar) so as to protrude therefrom.

The right lower collar 75 is interposed between the right lower engine-supporting frame portion 73 of the right pivot plate 45 and the rear lower mounting portion 71 of the engine 17. The right supporting bolt 77 is inserted through a through-hole 86 on the right lower engine-supporting frame portion 73, a through-hole 87 on the right lower collar 75, and a screw hole 71a on the rear lower mounting portion 71, and the distal screw portion 77b of the right supporting bolt 77 is screwed into the screw hole 71a on the rear lower mounting portion 71.

By pressing the inner lower collar end surface 79 against the collar abutting portion 71b of the rear lower mounting portion 71, the projections 81 formed on the end surface 79 of the inner lower collar are allowed to engage and form indentations in the collar-abutting portion 71b.

At the same time, by pressing the outer lower collar end surface 79 against the collar-abutting portion 73a of the right lower engine-supporting frame portion 73, the projections 81 formed on the end surface 79 of the outer upper collar are allowed to engage and form indentations in the collar-abutting portion 73a.

Accordingly, the right lower collar 75 is prevented from slipping with respect to the right lower engine-supporting frame portion 73 and the rear lower mounting portion 71 when interposing the right lower collar 75 between the right lower engine-supporting frame portion 73 and the rear lower mounting portion 71 of the engine 17.

The right stay 107 of the engine guard is clamped between the head 77a and the right nut 104 by fitting the right stay 107 of the engine guard onto the right screw portion 102 and screwing the right nut 104 onto the right screw portion 102 from the outside of the right stay 107.

Referring back to FIG. 7, an example in which the left supporting bolt 76 is attached to the left lower engine-supporting frame portion 72 will be described. In this case, a mounting hole 108 is formed on the left lower engine-supporting frame portion 72, a slit (not shown) is formed at the mounting hole 108, and a flanged socket 109 is inserted into the mounting hole 108. In this state, the bolt (not shown) is tightened and the gap of the slit is narrowed to fix the flanged socket 109 to the mounting hole 108.

Accordingly, the flanged socket 109 can be fixed to the left lower engine-supporting frame portion 72 so that the mounting hole 109a of the flanged socket 109 is used as a hole for inserting the left supporting bolt 76.

Therefore, the left supporting bolt 76 can be mounted to the left lower engine-supporting frame portion 72 as in the case of the right supporting bolt 77.

In this case, the shape of the end surfaces 67, 68 of the left and right upper collars provided on the left and right upper collars 64, 65 shown in FIG. 5, and the end surfaces 78, 79 of the left and right lower collars provided on the left and right lower collars 74, 75 shown in FIG. 7 are substantially the same, and the shape of the projections 69, 81 formed on the end surfaces 67, 68, 78, 79 of the collars are substantially the same.

Therefore, only the projections 69 on the end surface 68 of the right upper collar, which faces the collar-abutting portion 61a will be described as a representative example, and descriptions of the end surfaces or the projections of other collars are omitted.

Figure 9A:
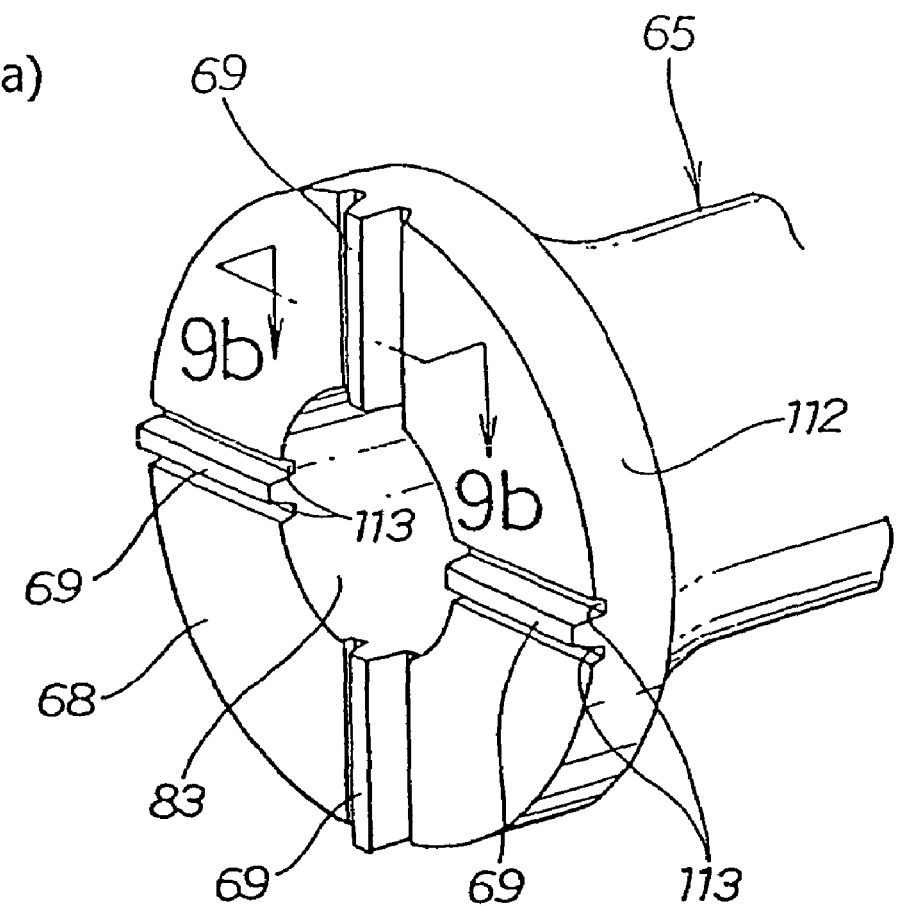
FIG. 9(a) is a perspective view showing a principal portion of the engine-supporting structure according to an embodiment of the present invention.
Figure 9B:
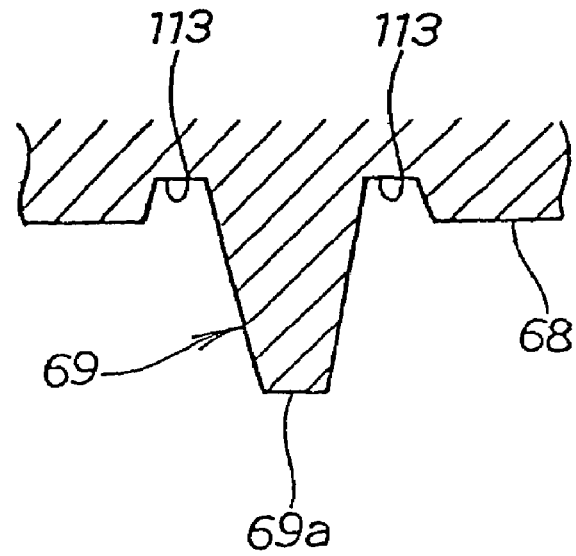
FIG. 9(b) is a cross sectional view taken along the line 9(b)—9(b) in FIG. 9(a).

FIG. 9(a) is a perspective view showing a principal portion of the engine-supporting structure according to the present invention, in which (b) is a cross sectional view taken along the line 9a–9b in (a).

The right upper collar end surface 68 is an annular surface formed with a through-hole 83 for fitting the rod-shaped member 66 at the center thereof, and having the outer periphery 112 formed concentrically with the through-hole 83. The annular surface includes flat surface areas, and the projections 69 are formed integrally formed with the flat surface areas so as to protrude therefrom.

The end surface 68 on the right upper collar is formed with four radial ridges (projections) 69 extending radially from the through-hole 83 (more specifically, from the center of the right upper collar 65). The projections 69 are formed with trapezoidal cross sections, as shown, and in the depicted embodiment, according to the first aspect hereof, grooves 113 are formed in the annular surface along both sides of each projection 69.

Since the projections 69 are radial ridges, a simple structure is achieved, and hence manufacturing is facilitated and designing is also facilitated.

Figure 10:
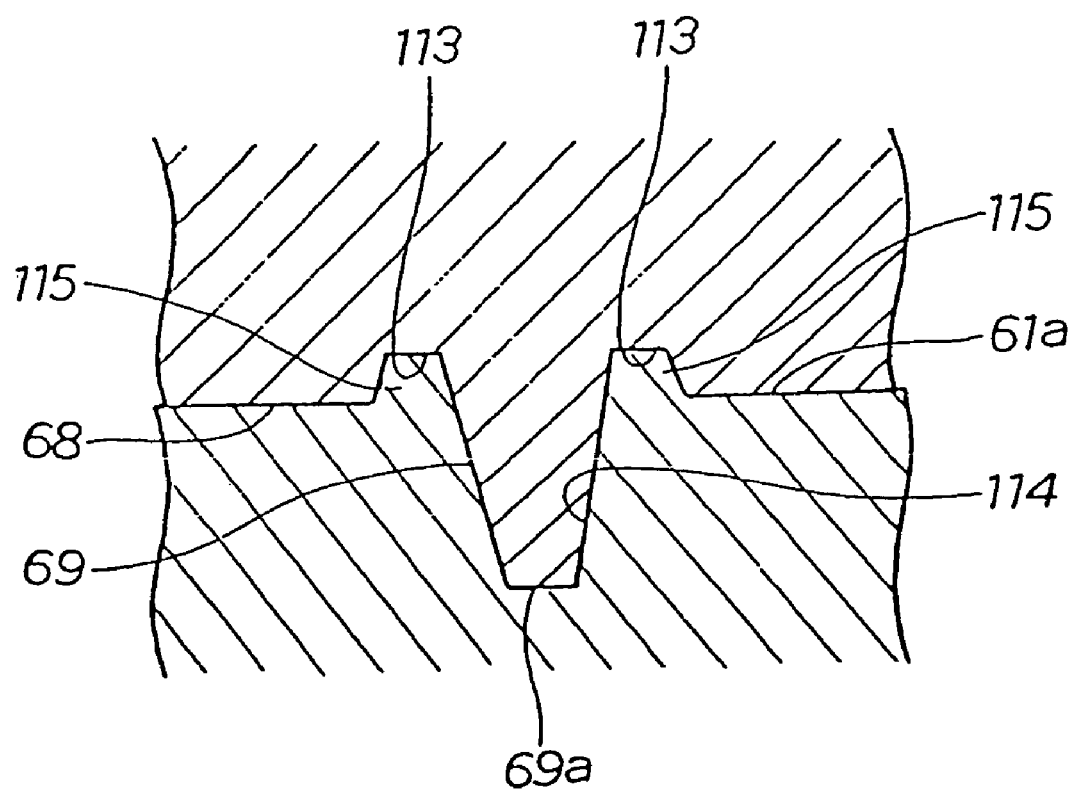
FIG. 10 is a cross sectional view taken along the line 10—10 in FIG. 5, according to an embodiment of the present invention.

FIG. 10 is a cross sectional view taken along the line 10—10 in FIG. 5.

As shown in FIG. 5, the projections 69 formed on the end surface 67 of the inner upper collar are allowed to engage and form indentations in the collar-abutting portion 61a by interposing the right upper collar 65 and the rear upper mounting portion 61 of the engine 17 by the rod-shaped member 66, and screwing the nut 94 on the screw portion 66a.

Accordingly, the end surface 68 of the inner upper collar is prevented from slipping with respect to the collar-abutting portion 61a.

Referring back to FIG. 9, by forming the projections 69 into radial ridges, the projections 69 are disposed in the direction orthogonal to the circumference of the end surface 68 of the inner right upper collar, and the projections 69 are elongated radially.

Therefore, a force to attempt to rotate the right upper collar 65 can be received efficiently by the projections 69, and further stable fixation of the right upper collar 65 to the collar-abutting portion 61a is ensured.

Subsequently, referring to FIG. 11 to FIG. 14, the operation of the upper engine-supporting structure 60 will be described. FIGS. 11(a) and (b) are first explanatory drawings showing an operation of the engine-supporting structure for a motorcycle according to the present invention.

In the drawing FIG. 11(a), the right upper collar 65 is interposed between the right upper collar 65 is interposed between the right upper engine-supporting frame portion 63 and the rear upper mounting portion 61 of the engine 17, and the right upper engine-supporting frame portion 63, the right upper collar 65, and the rear upper mounting portion 61 of the engine 17 are coupled by the rod-shaped member 66.

In the drawing FIG. 11(b), the screw 66a of the rod-shaped member 66 is projected from the right upper engine-supporting frame portion 63.

A washer 93 is fitted on the screw portion 66a projected from the right upper engine-supporting frame portion 63, a nut 94 is brought into abutment with the screw portion 66a from the outside of the washer 93 as indicated by an arrow, and the nut 94 is screwed thereon as indicated by an arrow.

FIGS. 12(a)–(c) are second explanatory drawings showing an operation of the engine-supporting structure for a motorcycle according to the present invention.

In FIG. 12(a), the end surface 68 of the inner upper collar is moved toward the collar-abutting portion 61a of the rear upper mounting portion 61 of the engine 17 as indicated by an arrow a, and the apexes 69a of the projections 69 (only one is shown in the drawing) formed on the end surface 68 of the inner upper collar presses against the collar-abutting portion 61a.

In FIG. 12(b), the end surface 68 of the inner upper collar moves further toward the collar-abutting portion 61a as indicated by an arrow a, and thus the apexes 69a of the projections 69 engages the collar abutting portion 61a.

By allowing the apexes 69a of the projections 69 to engage the collar-abutting portion 61a, the collar-abutting portion 61a is formed with indentations 114 and fluidizing phenomenon of the wall occurs. Then the peripheries of the indentations 114 (only one is shown) protrude and hence the protrusions 115 are generated.

In FIG. 12(c), the projections 69 engage the collar-abutting portion 61a to the proximal ends 69b thereof. In this case, the protrusions 115 generated around the indentations 114 are accommodated in the grooves 113 (only two are shown) formed at the positions in the vicinity of the projections 69.

Accordingly, the flat surface areas of the end surface 68 of the inner upper collar can be brought into close contact with the collar-abutting portion 61a, so that further stable fixation of the end surfaces 68 of the inner upper collar to the collar abutting portion 61a is ensured.

In this case, by forming the projections 69 into projections having a tapered trapezoidal cross section, the projections 69 can easily engage and form indentations in the collar-abutting portion 61a.

In addition, since the projections 69 are formed with trapezoidal cross sections, and the apexes 69a of the projections 69 are formed into flat surfaces, the apexes 69a of the projections 69 are prevented from being crushed.

Therefore, the collar-abutting portion 61a is subjected to plastic deformation by the projections 69 without causing the apexes 69a of the projections 69 to be crushed, so that the projections 69 effectively engage and form indentations in the collar-abutting portions 61a.

Therefore, for example, in the case in which the right upper collar 65 (see FIG. 11) is dismounted, for example, for maintenance, and the right upper collar 65 is re-mounted after completion of maintenance, the projections 69 on the end surface 68 of the inner upper collar are allowed to suitably engage the collar-abutting portion 61a.

Accordingly, when re-mounting the right upper collar 65, it is not necessary to replace the right upper collar 65.

FIGS. 13(a) and (b) are third explanatory drawings showing the operation of the engine-supporting structure for a motorcycle according to the present invention.

In FIG. 13(a), the nut 94 screwed onto the screw portion 66a is removed from the screw portion 66a by being rotated as indicated by an arrow b.

In FIG. 13(b), the rod-shaped member 66 is pulled out as indicated by an arrow c, and the collar 65 and rear upper mounting portion 61 of the engine 17 are removed from the right upper engine-supporting frame portion 63.

Figure 14A:
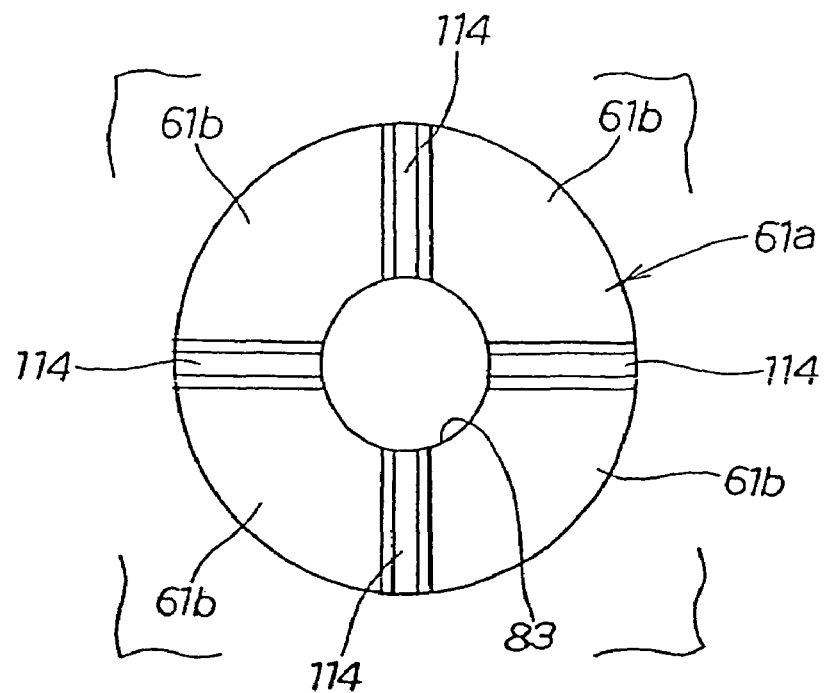
FIGS. 14(a) and (b) are fourth explanatory drawings showing the operation of the engine-supporting structure for a motorcycle according to an embodiment of the present invention.

FIGS. 14(a) and (b) are fourth explanatory drawings showing the operation of the engine-supporting structure for a motorcycle according to the present invention.

In FIG. 14(a), as also shown in FIG. 9, the end surface 68 of the right upper collar includes flat surface areas, and the projections 69 are integrally formed with the flat surface areas so as to protrude therefrom. Therefore, the flat surfaces are secured on the end surface 68 of the right upper collar.

In this manner, by securing flat surface areas on the end surface 68 of the right upper collar, the indentations 114 are formed only at the portions corresponding to the projections 69 when the end surface 68 of the right upper collar is brought into abutment with the collar-busting portion 61a, and hence the portion other than the indentations 114 (part of the collar-abutting portion 61a) can be left as the flat surface areas 61b.

Figure 14B:
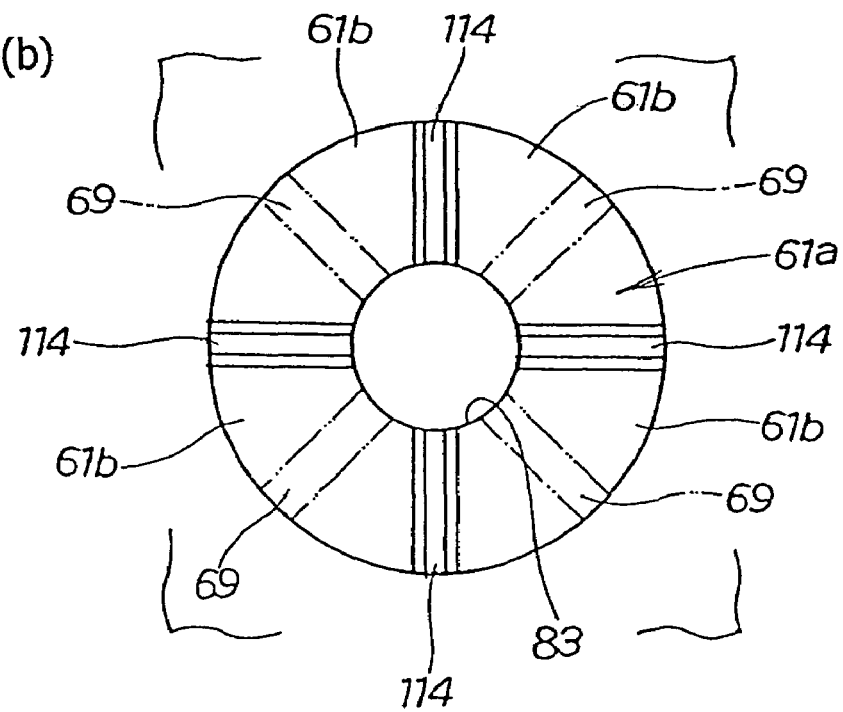

In FIG. 14(b), the right upper collar 65 (see FIG. 13) is dismounted, for example, for maintenance, and then the right upper collar 65 is re-mounted after completion of maintenance, the projections 69 on the end surface 68 of the right upper collar are rotated and allowed to engage new parts of the flat surface areas 61b left on the collar-abutting portion 61a.

Accordingly, when re-mounting the right upper collar 65, the projections 69 (shown by the dashed lines) are allowed to suitably engage the collar-abutting portion 61a. Therefore, troubles of repairing the collar-abutting portion 61a for securing the flat portion can be substantially avoided.

Subsequently, referring to FIG. 15 to FIG. 17, a first to ninth modifications of the end surface 68 of the right upper collar will be described.

In the first to the ninth modifications, the same components are represented by the same reference numerals as the embodiment described above, and the description is omitted.

Figure 15A:
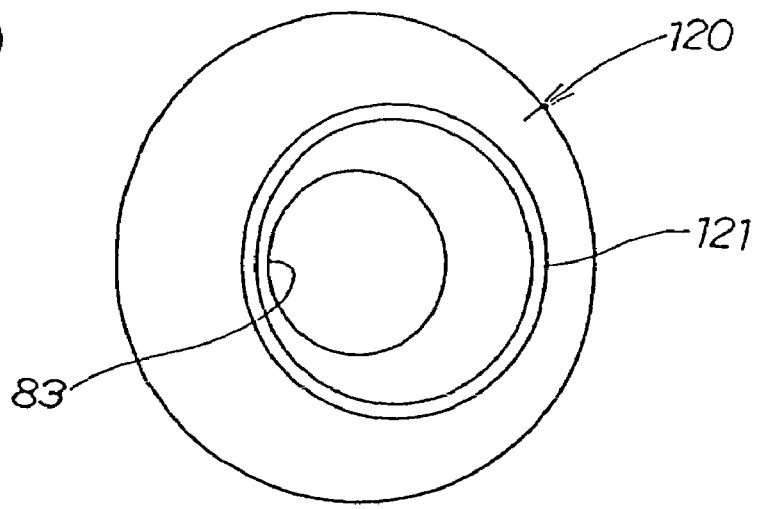
FIG. 15(a) is a plan view showing a first modification of the end surface of the right upper collar which constitutes part of the engine-supporting structure for a motorcycle according to an embodiment of the present invention; and (b) is a plan view showing a second modification of the end surface of the right upper collar according to an embodiment of the present invention; and (c) is a plan view showing a third modification of the end surface of the right upper collar according to an embodiment of the present invention.
Figure 15B:
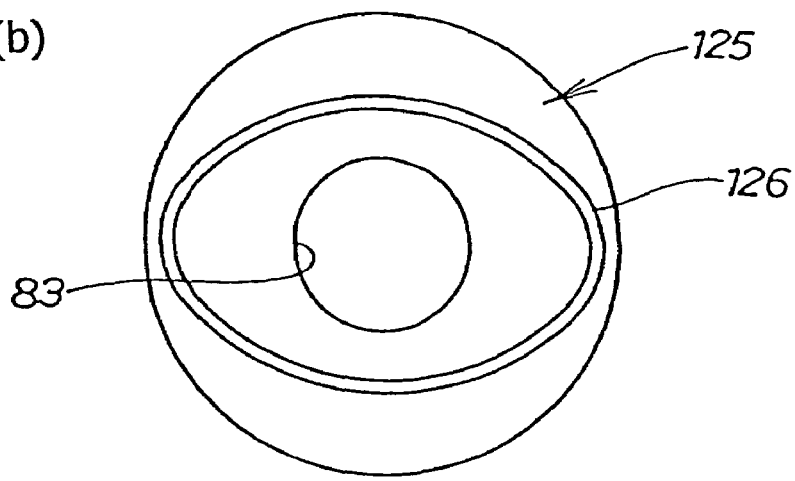
Figure 15C:
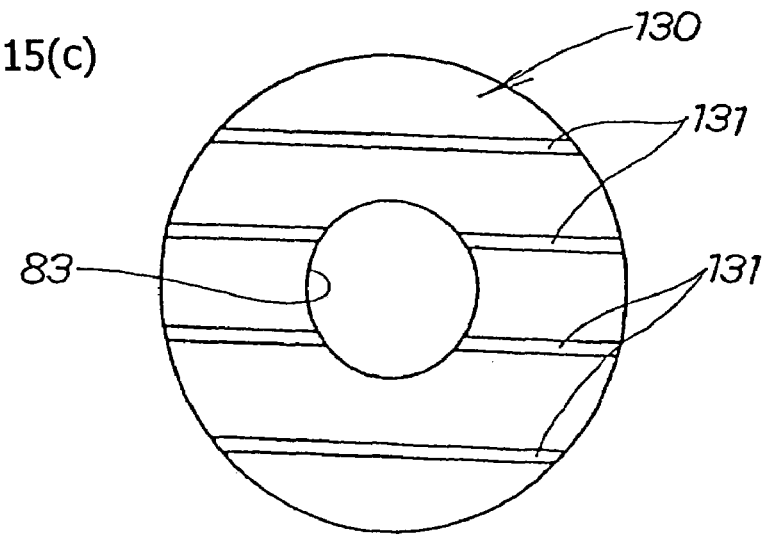

FIG. 15(a) is a plan view showing a first modification of the end surface of the right upper collar which constitutes part of the engine-supporting structure for a motorcycle according to the present invention, FIG. 15(b) is a plan view showing a second modification of the end surface of the right upper collar, FIG. 15(c) is a plan view showing a third modification of the end surface of the right upper collar.

An end surface 120 of the right upper collar in the first modification shown in FIG. 15(a) includes projection 121, which is an eccentric circular ridge off-center with respect to the center of the end surface 120 of the right upper collar.

With the end surface 120 of the right upper collar according to the first modification, the same advantages as the embodiment described above can be obtained, and in addition, the following advantage can be achieved:

Since the projection 121 is formed into an eccentric circular ridge off-center with respect to the center of the end surface 120 of the right upper collar, the projection 121 of a continuous shape is achieved.

Therefore, when machining the projection 121 with a cutting tool (not shown), the cutting tool can be controlled easily, and hence the projection can be machined easily.

The end surface 125 according to the second modification shown in (b) includes a projection 126, which is formed into an oval ridge.

With the end surface 125 of the right upper collar according to the second modification, the same advantages as the embodiment described above are obtained, and in addition, the following advantage is achieved:

Since the projection 126 is formed into an oval ridge, the projection 126 of a continuous shape is achieved.

Therefore, when machining the projection 126 with a cutting tool, the cutting tool can easily be controlled, and the projection 126 can be machined easily.

The end surface 130 of the right upper collar according to the third modification shown in FIG. 15(c) has a plurality of ridges 131 formed in parallel at regular intervals.

With the end surface 130 of the right upper collar of the third modification, the same advantages as the embodiment described above can be obtained, and in addition, the following advantage can be achieved.

Since the projections 131 are formed into a plurality of ridges, when the projections 131 are machined with a cutting tool, the cutting tool can be controlled easily and hence the projections 131 can be machined easily.

Figure 16A:
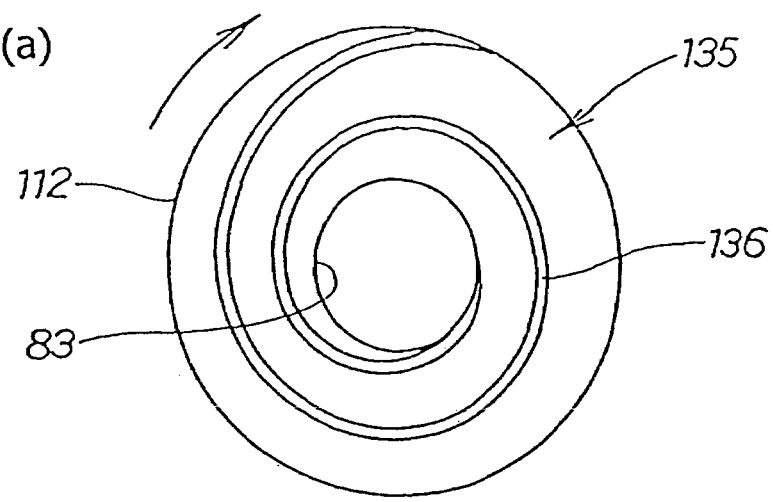
FIG. 16(a) is a plan view showing a fourth modification of the end surface of the right upper collar which constitutes part of the engine-supporting structure for a motorcycle according to an embodiment of the present invention; (b) is a plan view of a fifth modification of the end surface of the right upper collar; and (c) is a plan view showing a sixth modification of the end surface of the right upper collar according to an embodiment of the present invention.
Figure 16B:
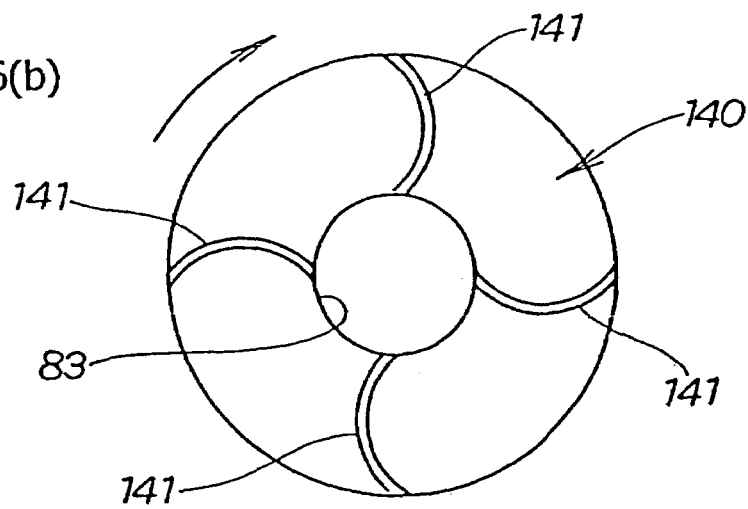
Figure 16C:
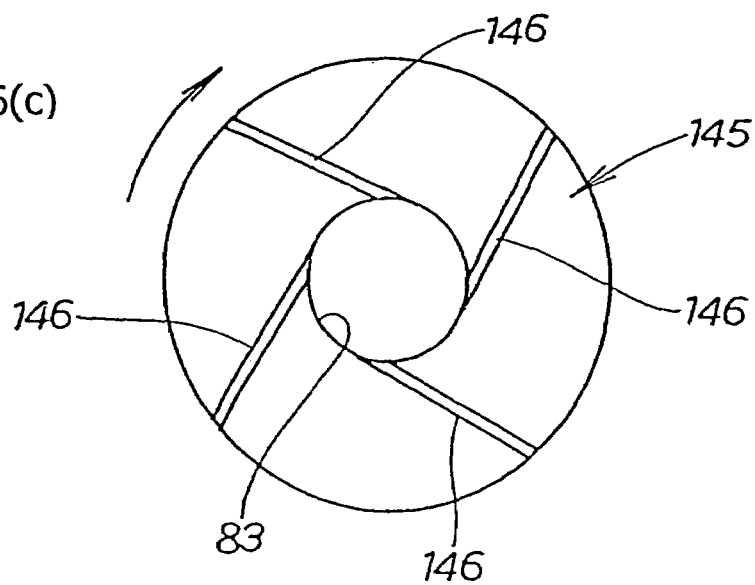

FIG. 16(a) is a plan view showing a fourth modification of the end surface of the right upper collar which constitutes part of the engine-supporting structure for a motorcycle according to the present invention, FIG. 16(b) is a plan view of a fifth modification of the end surface of the right upper collar, and FIG. 16(c) is a plan view showing a sixth modification of the end surface of the right upper collar.

An end surface 135 of the right upper collar of the fourth modification as shown in FIG. 16(a) includes a projection 136 formed into a helical ridge extending from the peripheral surface of the through hole 83 toward the outer periphery 112 in a helical shape.

With the end surface 135 of the right upper collar according to the fourth modification, the same advantages as the embodiment described above can be obtained, and in addition, the following advantage can be achieved.

In other words, since the projection 136 is formed into a helical ridge, the projection 136 of a continuous shape is achieved. Therefore, when machining the projection 136 with the cutting tool, the cutting toll can easily be controlled, and machining of the projection 136 can be performed easily.

In addition, by forming the projection 136 into a helical ridge, slippage in the direction indicated by the arrow can be restrained.

The end surface 140 of the right upper collar according to the fifth modification shown in FIG. 16(b) includes projections 141 which correspond to the projections 69 in the embodiment described above (see FIG. 9(a)), but are curved ridges.

With the end surface 140 of the right upper collar of the fifth modification, the same advantages as the embodiment described above can be obtained, and in addition, the following advantage is achieved.

By forming the projections 141 into the curved ridges, slippage in the direction indicated by an arrow can be restrained further reliably.

The end surface 145 of the right upper collar according to the sixth modification shown in FIG. 16(c) includes projections 146 which correspond to the projections 69 in the embodiment described above (see FIG. 9(a)), but are inclined ridges inclined in one direction.

With the end surface 145 of the right upper collar according to the sixth modification, the same advantages as the embodiment described above can be obtained, and in addition, the following advantage can be achieved.

By forming the projections 146 into the inclined ridges, slippage in the direction indicated by an arrow can be restrained further reliably.

Figure 17A:
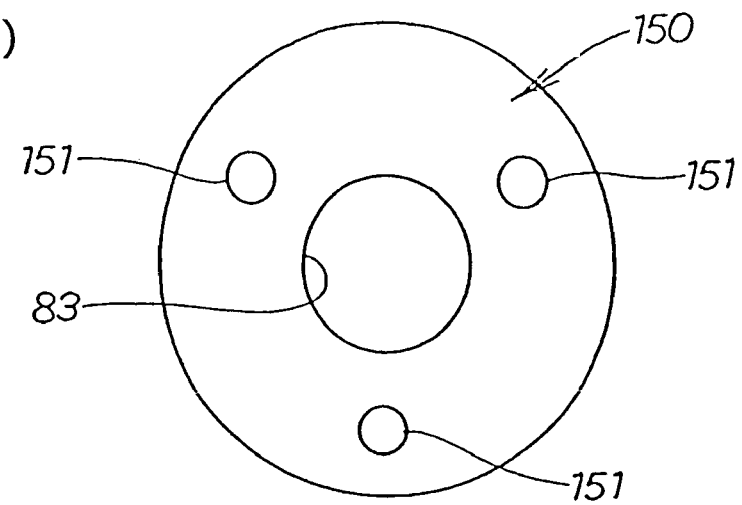
FIG. 17(a) is a plan view showing a seventh modification of the end surface of the right upper collar which constitutes part of the engine-supporting structure for a motorcycle according to an embodiment of the present invention.
Figure 17B:
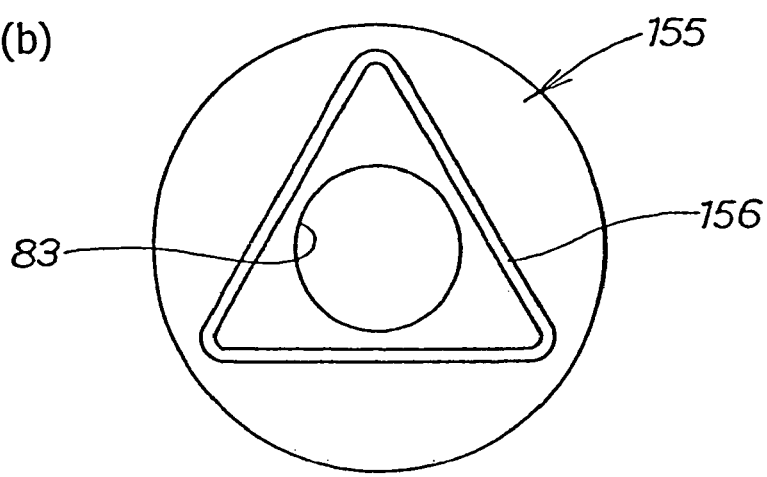
FIG. 17(b) is a plan view showing an eighth modification of the end surface of the right upper collar according to an embodiment of the present invention.
Figure 17C:
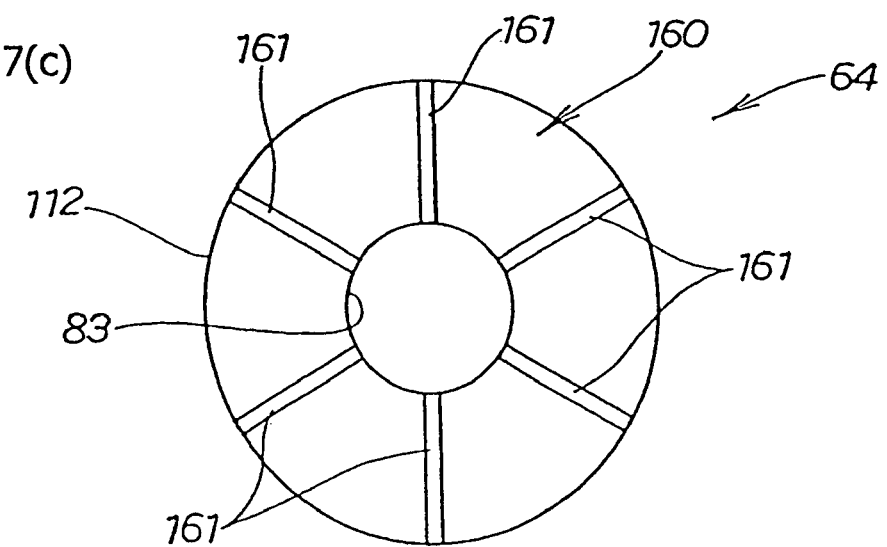
FIG. 17(c) is a plan view showing a ninth modification of the end surface of the right upper collar according to an embodiment of the present invention.

FIG. 17(a) is a plan view showing a seventh modification of the end surface of the right upper collar which constitutes part of the engine-supporting structure for a motorcycle according to the present invention, FIG. 17(b) is a plan view showing an eighth modification of the end surface of the right upper collar, and FIG. 17(c) is a plan view showing a ninth modification of the end surface of the right upper collar.

An end surface 150 of the right upper collar according to the seventh modification shown in FIG. 17(a) includes three projections 151 formed on the flat surface at regular intervals.

With the end surface 150 of the right upper collar according to the seventh modification shown in FIG. 17(a), the same advantages as the embodiment described above can be achieved.

An end surface 155 of the right upper collar according to the eighth modification shown in FIG. 17(b) includes a projection 156 formed into a triangular ridge of triangular shape surrounding the through hole 83.

With the end surface 155 of the right upper collar according to the eighth modification, the same advantages as the embodiment described above can be obtained.

An end surface 160 of the right upper collar of the ninth modification shown in FIG. 17(c) includes projections 161 formed into six radial ridges extending from the through-hole 83 (that is, from the center of the collar) radially toward the outer periphery 112.

With the end surface 160 of the right upper collar according to the ninth modification, the same advantages as the embodiment described above can be obtained, and in addition, by increasing the number of the projections 161 to the number larger than four, the right upper collar 65 can be prevented from slipping more efficiently.

Figure 18:
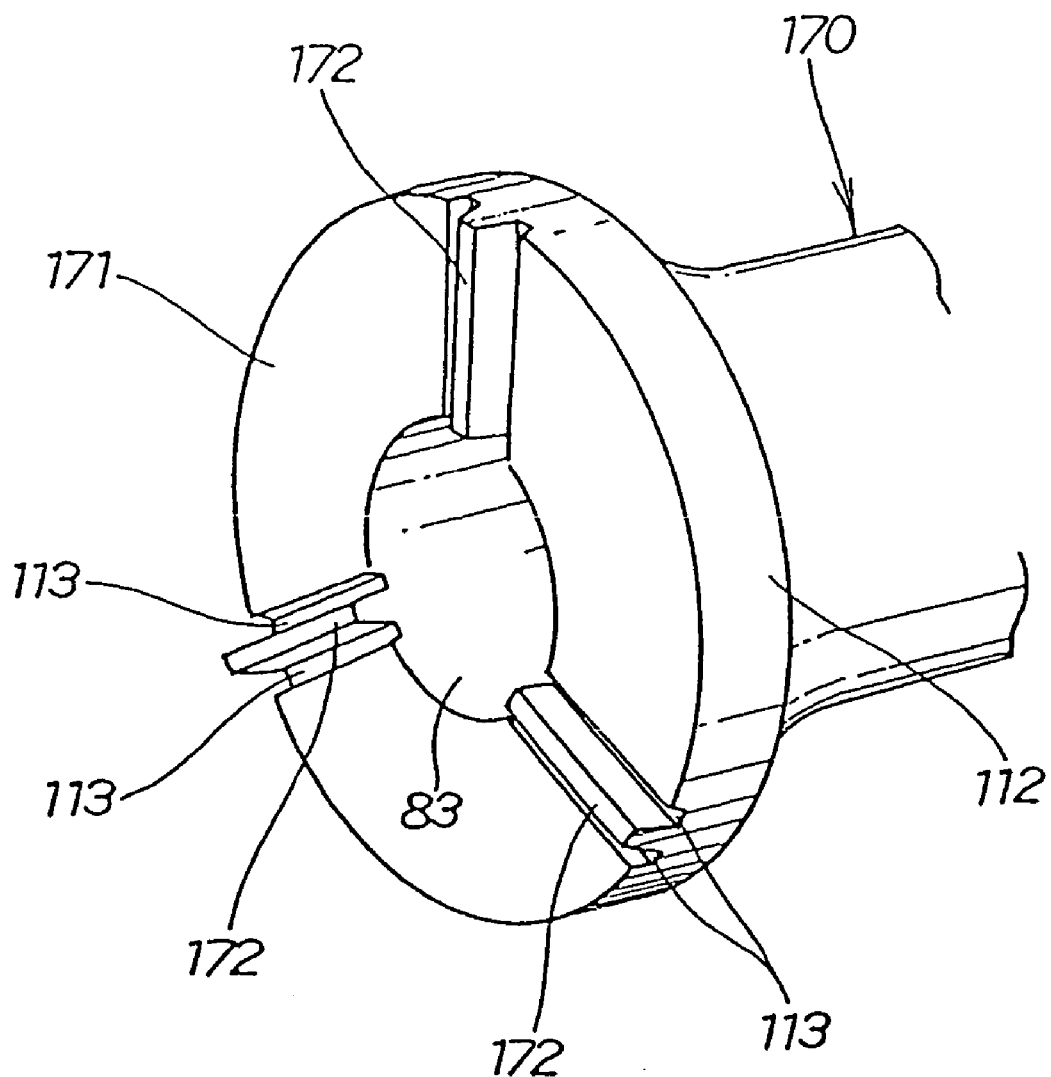
FIG. 18 is a perspective view showing a tenth modification of the right upper collar which constitutes part of the engine-supporting structure for a motorcycle according to an embodiment of the present invention.

FIG. 18 is a perspective view showing a tenth modification of the end surface of the right upper collar which constitutes part of the engine-supporting structure for a motorcycle according to the present invention.

A right upper collar 170 of the tenth modification includes an end surface 171 of the right upper collar. The end surface 171 of the right upper collar includes projections 172 formed into three radial ridges extending from the through-hole 83 (the center of the collar) radially toward the outer periphery 112.

The projection 172 has the same shape as the projection 69 (see FIG. 9) of the embodiment described above.

According to the right upper collar 170 of the tenth modification, by forming the projections 172, the same advantages as the embodiment described above can be obtained.

In addition, by decreasing the number of the projections 172 to three, which is lesser than four in the embodiment described above, the projections 172 can be machined easily when machining the projections 172 (the end surfaces 171 of the right upper collar) with the cutting tool (not shown).

In addition, by decreasing the number of the projections 172 to three, the number of the indentations 114 marked on the collar-abutting portion 61a by the projections 172 is decreased to three when the end surface 171 of the right upper collar is abutted against the collar-abutting portion 61a (see FIG. 14(a)).

Therefore, the flat portion 61b (see FIG. 14(a)) which is larger than the embodiment described above, can be left on the collar-abutting portion 61a.

The flat surface 61b is used as an area for allowing the projections 172 on the end surface 171 of the right upper collar to engage in the case where the right upper collar 170 is dismounted for the purpose of maintenance, and the right upper collar 170 is re-mounted after completion of maintenance.

Therefore, by leaving the flat surface 61b as a large area, the number of remounting (the number of times to mount) of the right upper collar 170 can be increased.

In addition, by reducing the number of the projections 172 can engage the collar-abutting portion 61a easily when mounting the right upper collar 170.

Accordingly, collar-tightening torque can be restrained to a low level when mounting the right upper collar 170.

Subsequently, referring to FIG. 19 to FIG. 24, an example in which the engine-supporting structure according to the present invention is applied to a different type of motorcycle will be described. In the motorcycle shown below, the same members as the motorcycle 10 are represented by the same reference numerals and description will be omitted.

Figure 19:
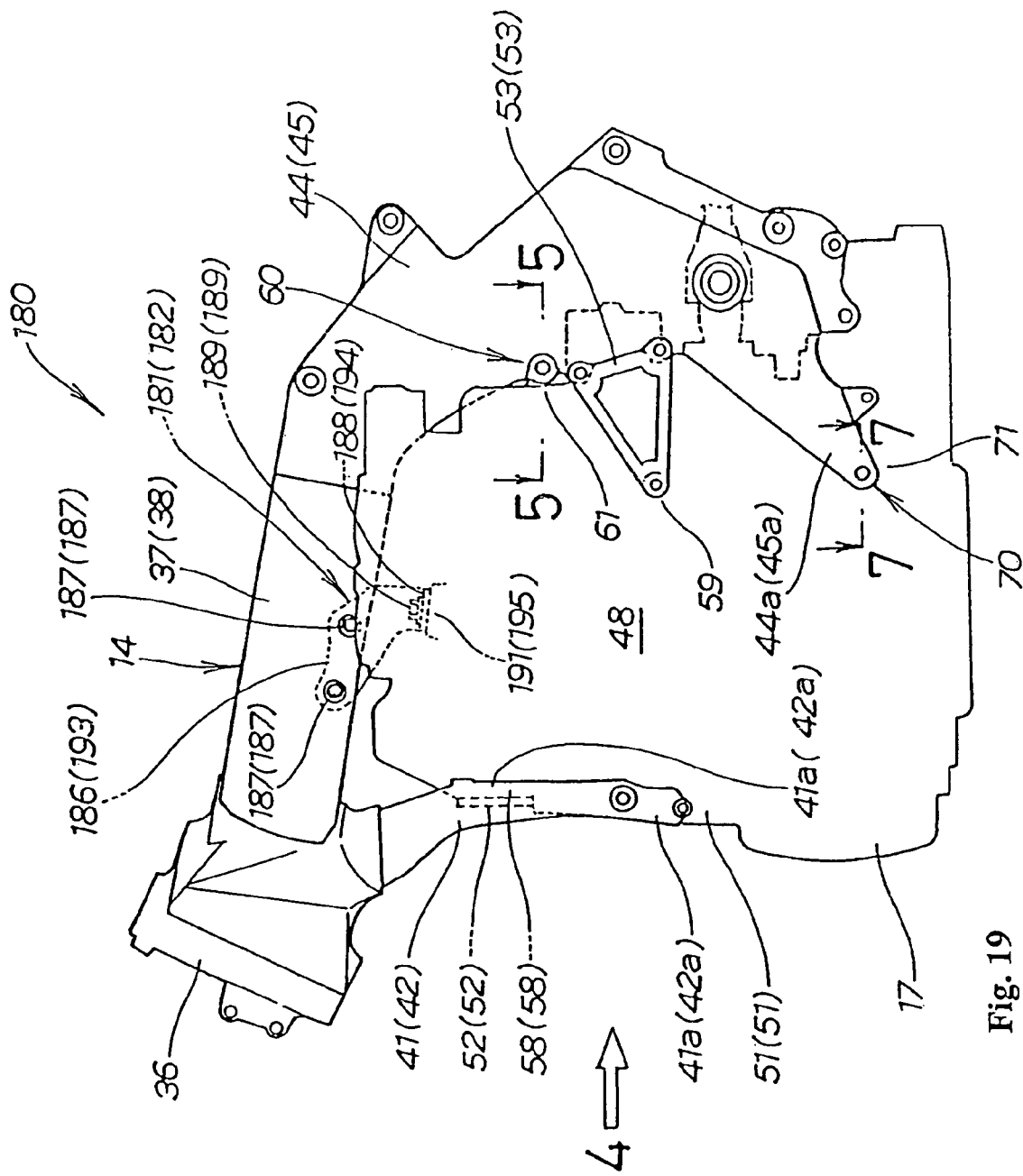
FIG. 19 is a side view showing an example in which the engine-supporting structure according to the present invention is applied to another type of motorcycle.

FIG. 19 is a side view showing an example in which the engine-supporting structure according to the present invention is applied to another type of motorcycle.

The motorcycle 180 has the same structure as the motorcycle 10 except that left and right upper supporting brackets 181, 182 for supporting the engine 17 are added and the mounting positions of the left and right knock sensors 183, 184 (see FIG. 21) are changed in comparison with the motorcycle 10 shown in FIG. 1.

The left and right upper supporting brackets 181, 182 and the left and right knock sensors 183, 184 will be described below.

The left upper supporting bracket 181 is attached to a left main pipe 37 with bolts 187, 187 at the upper end 186 thereof, and to a left mounting boss 191 with a bolt 189 at the lower end 188 thereof.

The right upper supporting bracket 182 is a member symmetrical with the left upper supporting bracket 181, and is mounted to a right main pipe 38 with the bolts 187, 187 at the upper end 193 thereof, and to the right mounting boss 195 with the bolt 189 at the lower end 194 thereof.

Figure 20:
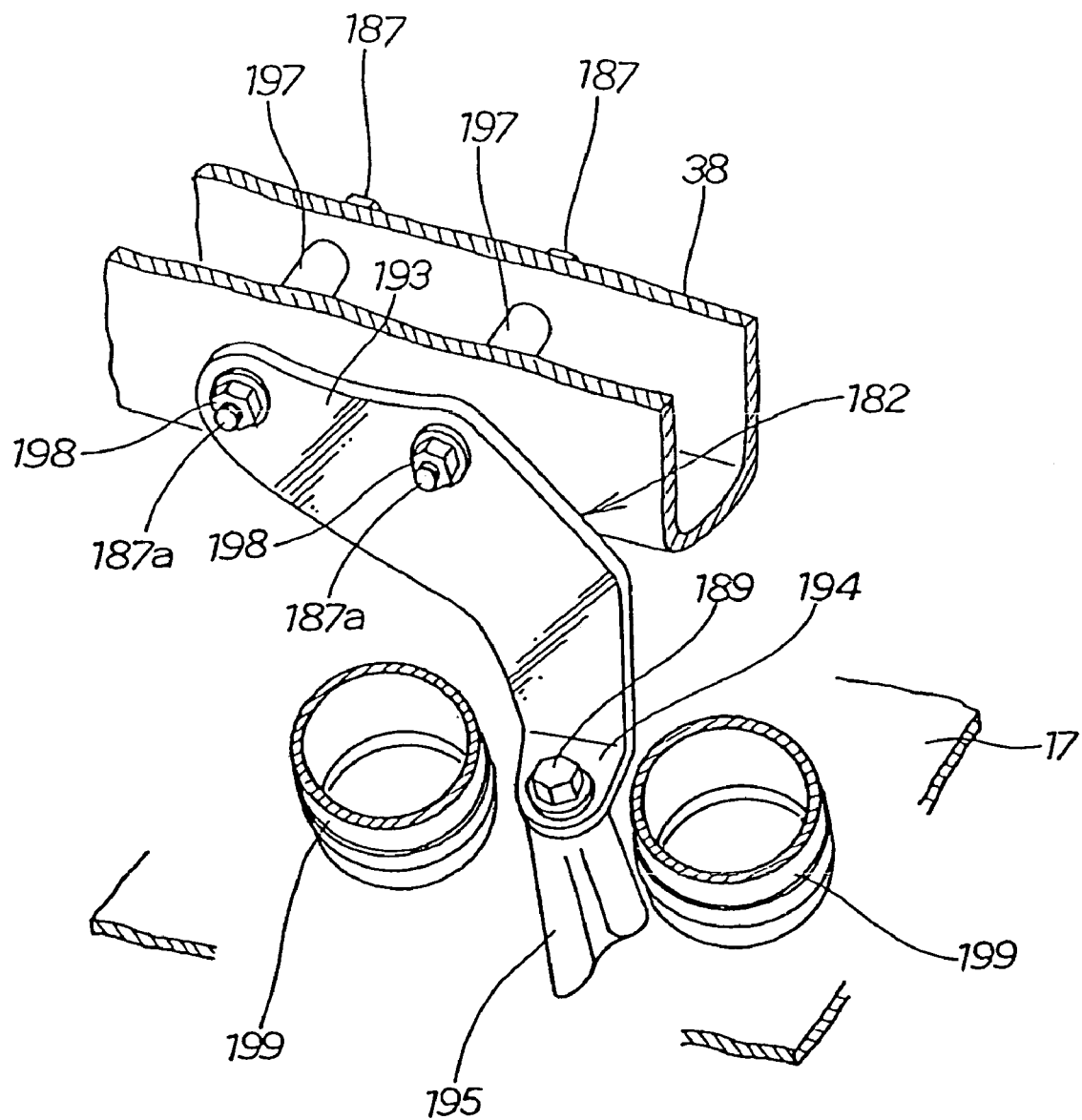
FIG. 20 is a perspective view showing a right upper supporting bracket for another type of motorcycle to which the present invention is applied.

FIG. 20 is a perspective view showing a right upper supporting bracket for another type of motorcycle to which the present invention is applied.

A pair of left spacers 197 is passed through the right main pipe 38, and the bolts 187 are inserted into the pair of left spacers 197, respectively. Mounting holes (not shown) of the right upper supporting bracket 182 is fitted on extremities 187a of the bolts 187 projected from the spacers 197.

Nuts 198 are screwed on the extremities 187a of the bolts 187. The upper end 193 of the right upper supporting bracket 182 is attached to the right main pipe 38 via spacers 197.

The lower end 194 of the right upper supporting bracket 182 is bent inward and the bent lower end 194 is attached to the right upper boss 195 with the bolt 189.

The right upper boss 195 is a member formed between inlet pipes 199 for air intake.

With the right upper boss 195, the upper portion of the engine 17 is connected to the right main pipe 38 via the right upper supporting bracket 182.

The upper portion of the engine 17 is also connected to the left main pipe 37 with the left upper supporting bracket 181 in the same manner as the right upper supporting bracket 182.

Figure 21:
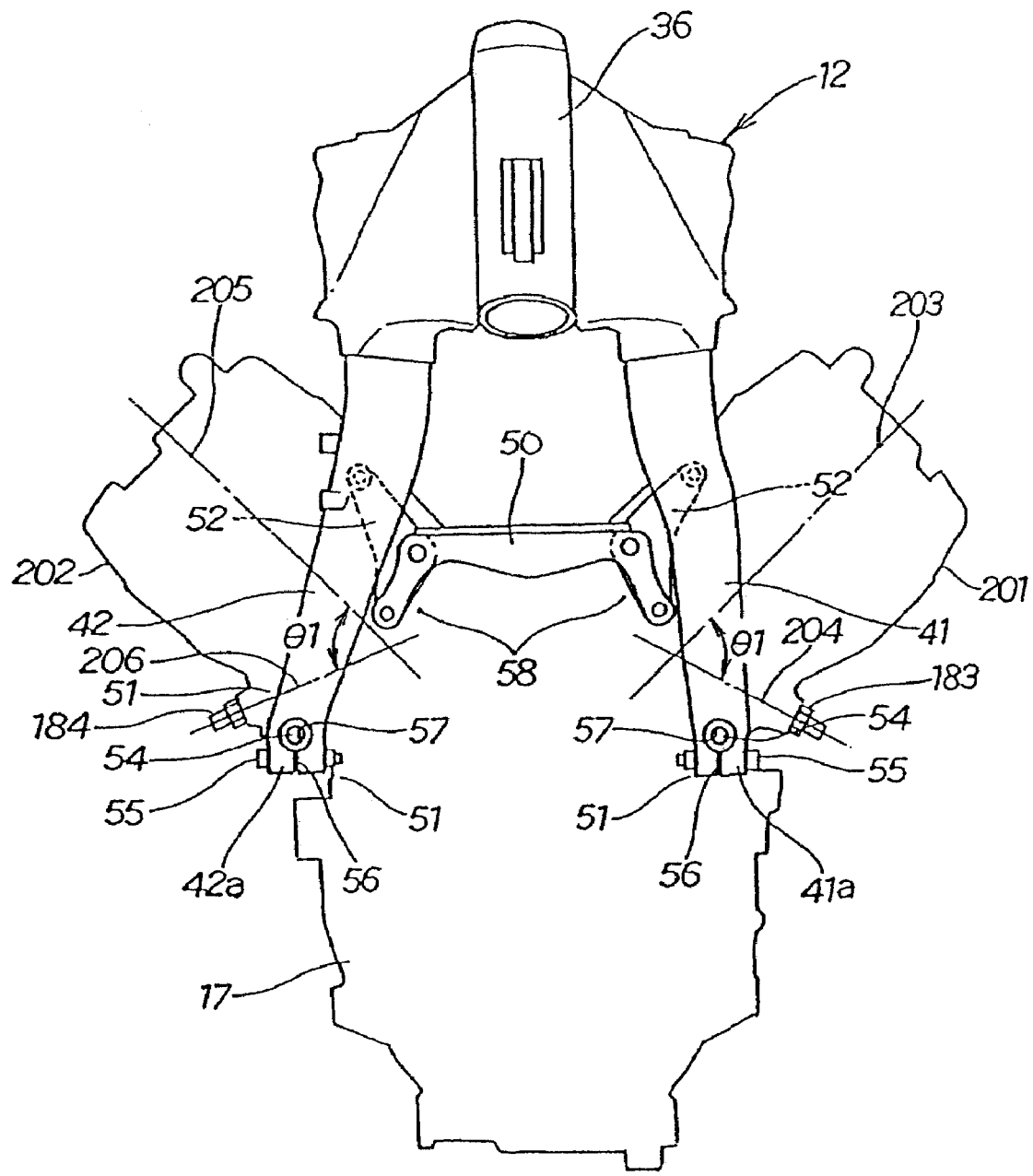
FIG. 21 is a front view showing an example in which a knock sensor is mounted to another type of motorcycle to which the present invention is applied.

FIG. 21 is a front view showing an example in which a knock sensor is mounted to another type of motorcycle to which the present invention is applied.

A left knock sensor 183 is mounted to the side wall 201 of a left cylinder of the engine 17 and a right knock sensor 184 is mounted to the side wall 202 of the right cylinder of the engine 17.

The mounting angle between the centerline 203 of the left cylinder and the centerline 204 of the left knock sensor 183 is set to θ1, and the mounting angle between the centerline 205 of the right cylinder and the centerline 206 of the right knock sensor 184 is set to θ1.

These mounting angles θ1 is an angle close to 90 degrees.

The left knock sensor 183 includes, for example, a piezo element integrated therein, for detecting vibrations generated by knocking, when the knocking occurs in a combustion chamber in the left side engine.

The right knock sensor 184 includes, for example, a piezo element integrated therein as in the case of the left knock sensor 183, for detecting vibrations generated by knocking, when the knocking occurs in the combustion chamber in the right side engine.

Figure 22:
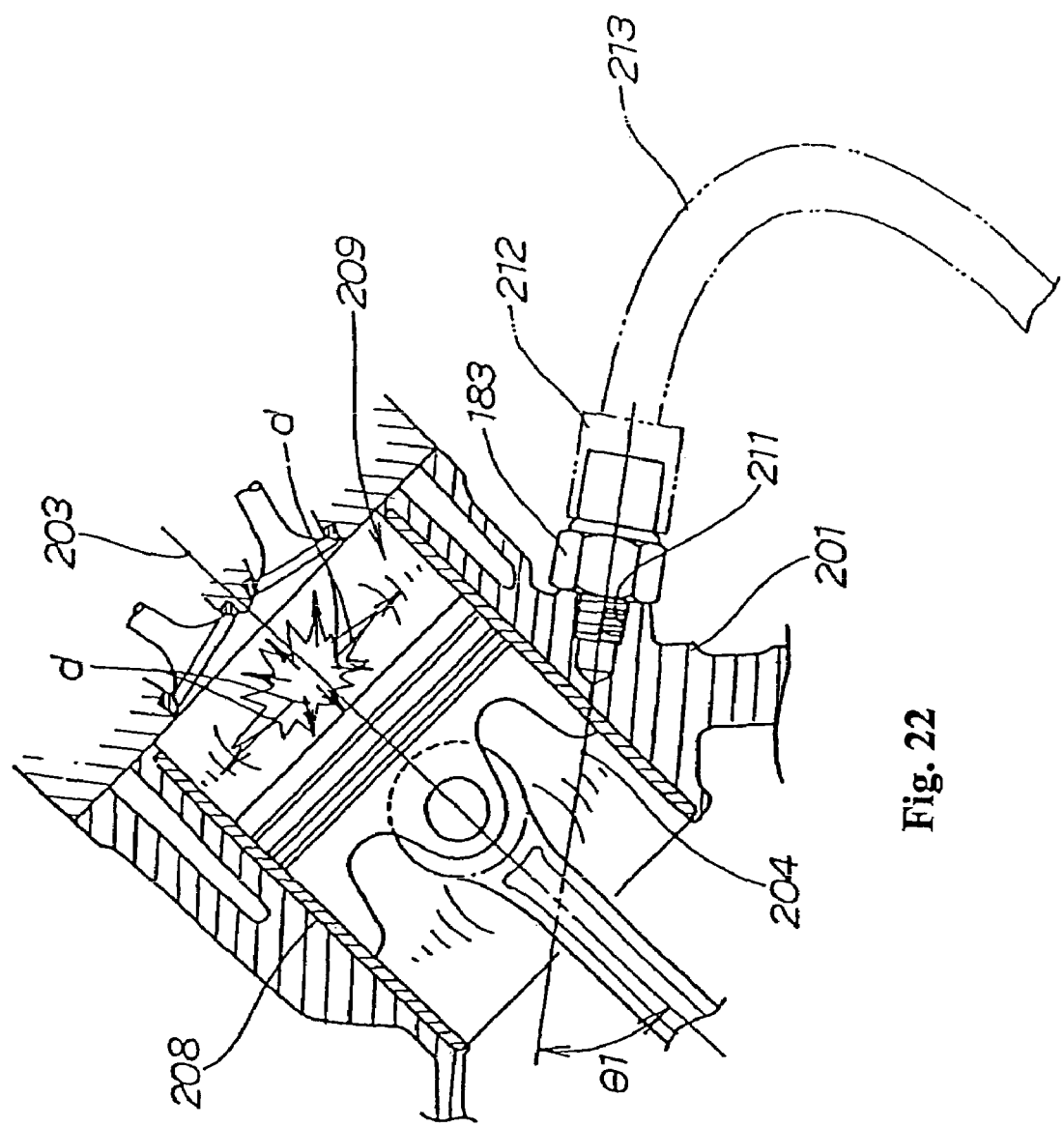
FIG. 22 is an explanatory cross sectional view showing an example in which knocking vibrations are detected in another type of motorcycle to which the present invention is applied.

FIG. 22 is an explanatory cross sectional view showing an example in which knocking vibrations are detected in other types of motorcycle to which the present invention is applied.

A mounting hole 211 is formed on the side wall 201 of the left cylinder 208 and the left knock sensor 183 is screwed in the mounting hole 211. By connecting a connector 212 of the left knock sensor 183, the left knock sensor 183 is connected to a control unit (not shown) via a harness 213.

The left knock sensor 183 is provided with a feature to suitably detect vibrations by directing the centerline 204 in the direction in which knocking vibrations are transmitted.

If knocking occurs in the combustion chamber 209 in the left cylinder 208, vibrations caused by knocking is transmitted in the combustion chamber 209 in the left cylinder 208 as indicated by an arrow d.

Therefore, considering the detecting feature of the left knock sensor 183 described above, the left knock sensor 183 is placed closer to the combustion chamber 209, and the mounting angle between the centerline 203 of the left cylinder 208 and the centerline 204 of the left knock sensor 183, which is represented by θ1, is set to a value closer to 90 degrees.

In this manner, by placing the left knock sensor 183 at a position closer to the combustion chamber 209, and setting the mounting angle θ1 to an angle close to 90 degrees, the centerline 204 of the left knock sensor 183 can be oriented closer to the direction in which knocking vibration is transmitted (the direction indicated by the arrow d).

Therefore, vibrations caused by knocking can be detected suitably by the left knock sensor 183.

An example in which knocking vibrations are detected in a state in which the left knock sensor 183 is placed at a position closer to the combustion chamber 209 and the mounting angle of the left knock sensor 183 is set to θ1 will described referring to FIG. 23.

Figure 23A:
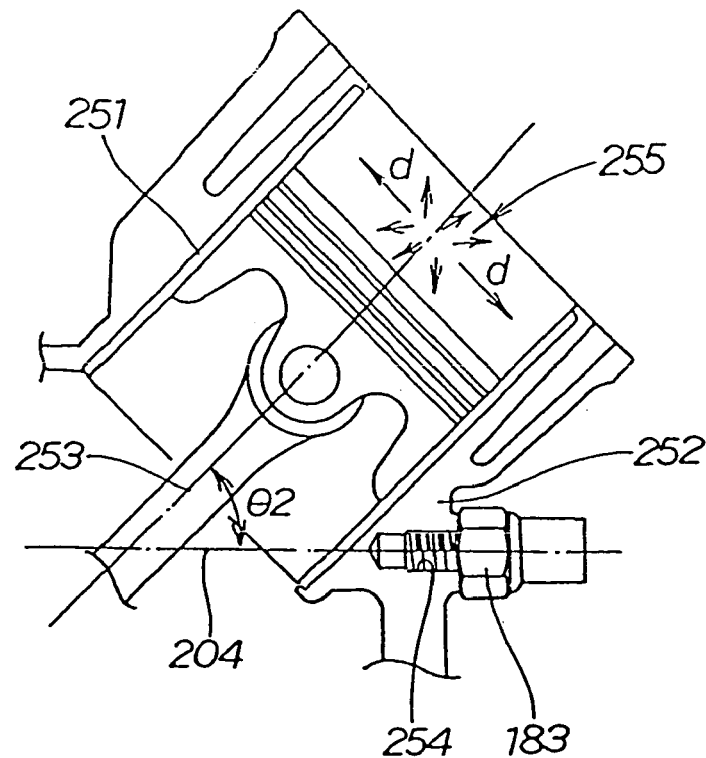
FIGS. 23(a), (b) are explanatory drawings showing the knock sensor mounting angle of a motorcycle to which the present invention is applied.
Figure 23B:
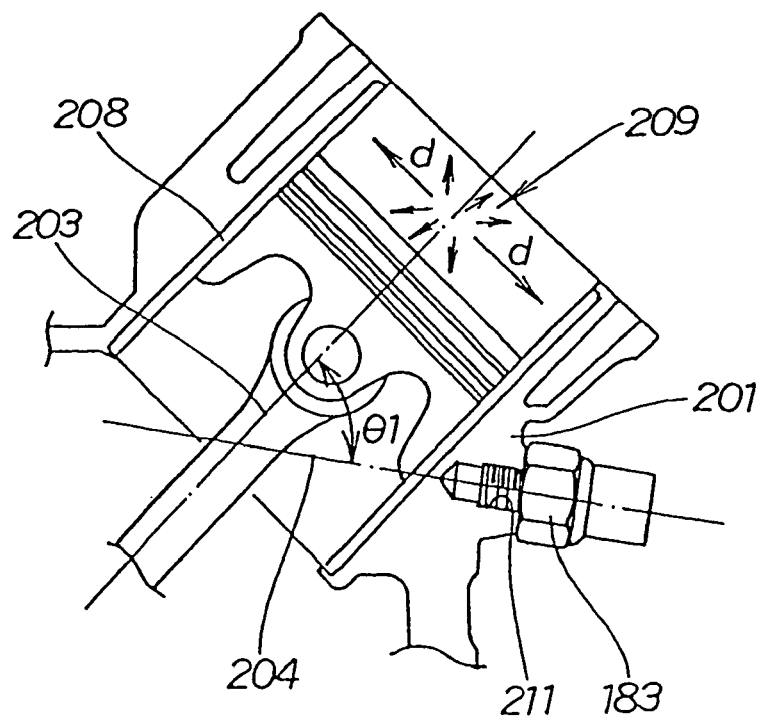
Figure 24:
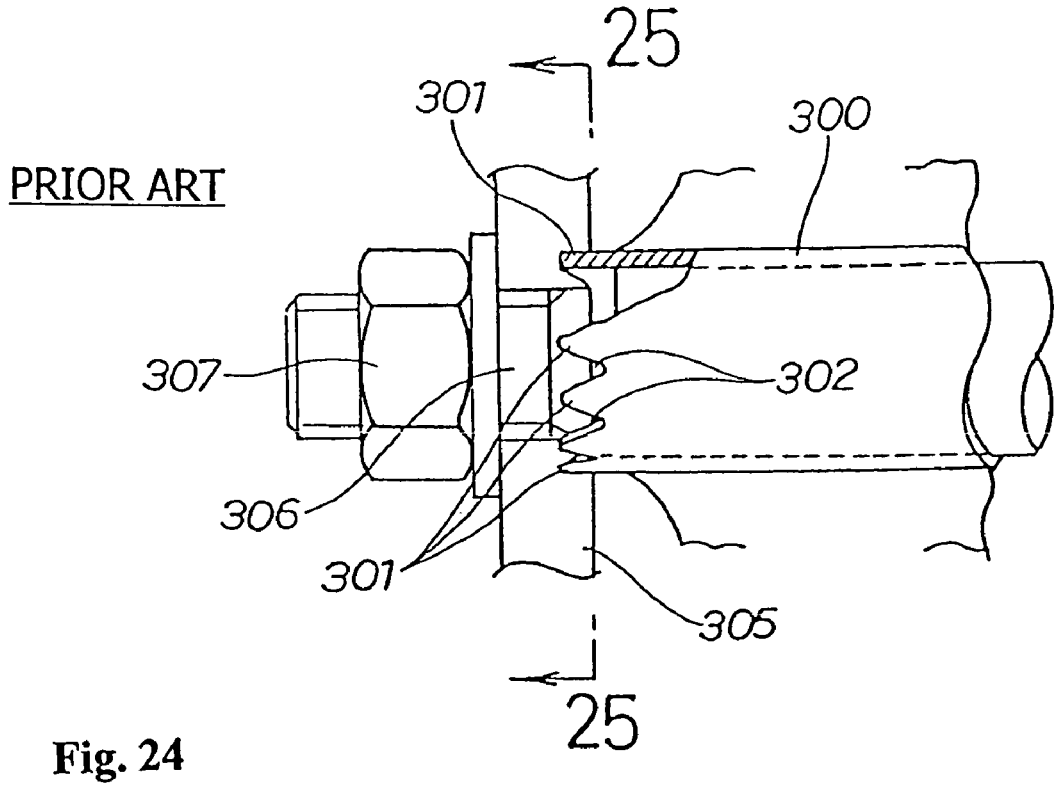
FIG. 24 of the present application is a reproduced version of FIG. 3 from Japanese patent publication JP-UM-A-57-165827, and is a side plan view, partially cut away and partially in cross-section, showing some prior art engine mounting hardware.
Figure 25:
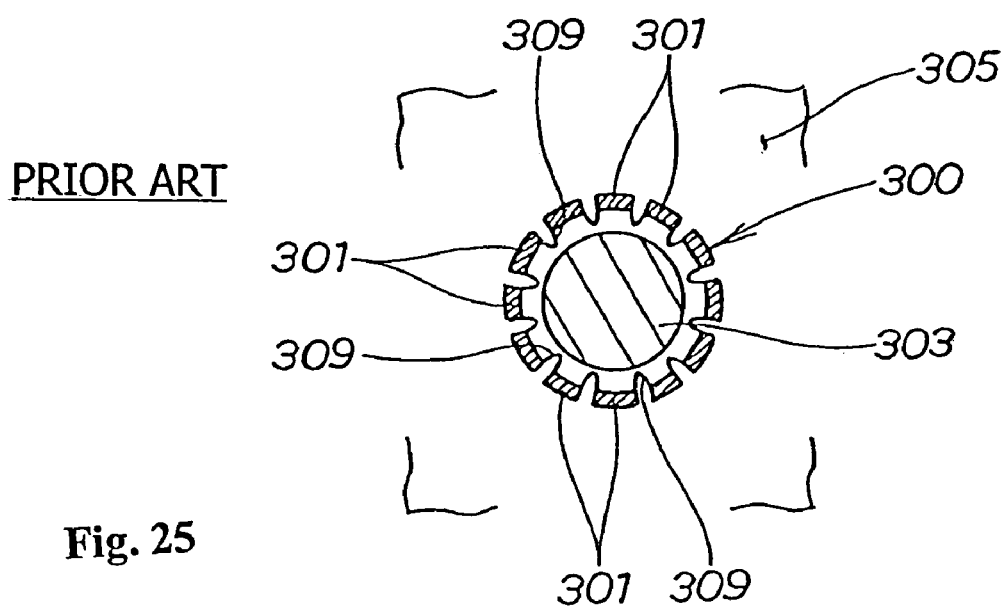
FIG. 25 is a cross sectional view taken along the line 25—25 in FIG. 24.

FIGS. 23(a) and (b) are explanatory drawings showing the knock sensor mounting angle of a motorcycle to which the present invention is applied as a comparative example, in which FIG. 23(a) shows an embodiment of θ2<θ1, where the mounting angle is θ2, and FIG. 23(b) shows a second embodiment (mounting angle: θ1) as a practical example.

In FIG. 23(a), the left knock sensor 183 is mounted at a position apart from the combustion chamber 255. In addition, since the left knock sensor 183 is mounted so that the centerline 204 lies horizontally with respect to the ground, the mounting angle between the centerline 204 of the left knock sensor 183 and the centerline 253 of the left cylinder 251 becomes as small as θ2.

If knocking occurs in the combustion chamber 255 in the left cylinder 251, vibrations caused by knocking are transmitted radially in the combustion chamber 255 in the left cylinder 251 as indicated by the arrow d.

Since the left knock sensor 183 is mounted at a position apart from the combustion chamber 255, and the mounting angle is as small as θ2, it is difficult to detect knocking vibrations by the left knock sensor 183 with a high degree of sensitivity.

Therefore, practical application of a technology has been desired which enables improved detection of vibrations caused by knocking by the left knock sensor 183.

In FIG. 23(b), the left knock sensor 183 is mounted at a position closer to the combustion chamber 209 in comparison with the comparative example in FIG. 23(a). In addition, since the left knock sensor 183 is inclined upward, the mounting angle θ between the centerline 204 of the left knock sensor 183 and the centerline 203 of the left cylinder 208 can be set to an angle close to 90 degrees.

If knocking occurs in the combustion chamber 209 in the left cylinder 208, vibrations caused by knocking are transmitted radially in the combustion chamber 209 in the left cylinder 208 as indicated by an arrow d.

By placing the left knock sensor 183 at a position close to the combustion chamber 209, and setting the mounting angle θ1 to an angle close to 90 degrees, the centerline 204 of the left knock sensor 183 can be oriented close to the direction in which knocking vibrations are transmitted (the direction indicated by the arrow d).

Therefore, vibrations caused by knocking can be detected by the left knock sensor 183 further suitably.

Although the present invention has been described herein with respect to a limited number of presently preferred embodiments, the foregoing description is intended to illustrate, rather than to limit the scope of the invention. Those skilled in the art will realize that many modifications of the preferred embodiment could be made which would be operable. All such modifications, which are within the scope of the claims, are intended to be within the scope and spirit of the present invention.

For example, the engine-supporting structure according to the present invention is not limited to the collar described in the embodiments described above, and may be applied to collars of other shapes.

The left and right upper supporting brackets 181, 182 described in the embodiments described above are not limited to the configuration shown, and may be modified as needed.

While the left and right knock sensors 183, 184 described in the embodiments described above detect knocking vibrations by the piezo element, they are not limited thereto.

Having thus, described the invention, what is claimed is:

1. In a motorcycle having engine and a vehicle body frame, an engine-supporting structure for use in supporting the engine on the vehicle body frame, said engine-supporting structure comprising:
a first collar inserted between a first engine-supporting frame portion provided on the vehicle body frame and an engine case portion of the engine, and
a first rod-shaped fastening member interconnecting the engine-supporting frame portion, the collar, and the engine,
wherein the collar is provided with an end surface comprising a flat surface portion, and a plurality of projections protruding outwardly from the flat surface portion, the projections provided to engage the engine-supporting frame portion or the engine case portion when the first rod-shaped fastening member abuts against the first collar, and
wherein the first collar is formed of harder material than the material which forms the engine-supporting frame portion and the engine case portion.

2. An engine-supporting structure for a motorcycle according to claim 1, wherein each of said projections of said collar end surface comprises a trapezoidal cross section.

3. An engine-supporting structure for a motorcycle according to claim 1, wherein said collar end surface further comprises grooves formed therein proximate the projections.

4. An engine-supporting structure for a motorcycle according to claim 1, wherein said projections further comprise ridges extending radially from a central portion of the collar end surface.

5. An engine-supporting structure for a motorcycle according to claim 1, wherein said projections further comprise an eccentric ridge which is off-center with respect to the center of the collar end surface.

6. In a motorcycle having engine and a vehicle body frame, an engine-supporting structure for use in supporting the engine on the vehicle body frame, said engine-supporting structure comprising:
a first collar inserted between a first engine-supporting frame portion provided on the vehicle body frame and an engine case portion of the engine, and
a first rod-shaped fastening member interconnecting the engine-supporting frame portion, the collar, and the engine,
wherein the collar is provided with an end surface comprising a flat surface portion, and a projection protruding outwardly from the flat surface portion, the projection provided to engage the engine-supporting frame portion or the engine case portion when the first rod-shaped fastening member abuts against the first collar, and
wherein the first collar is formed of harder material than the material which forms the engine-supporting frame portion and the engine case portion, and
wherein said projection further comprises a substantially oval ridge.

7. The engine-supporting structure of claim 1, wherein the first rod-shaped fastening member comprises a threaded fastener.

8. The engine-supporting structure of claim 7, wherein the fastener comprises a fastener head, and wherein the fastener head has an integral reduced-diameter threaded stud thereon extending in a direction opposite the main body of the rod-shaped fastening member.

9. The engine-supporting structure of claim 1, further comprising a second collar which is substantially identical to the first collar, and a second rod-shaped fastening member which is substantially identical to the first rod-shaped fastening member, for placement on a side of the engine opposite the first collar and the first rod-shaped fastening member, and for connecting the engine case portion to a second engine-supporting frame portion provided on the vehicle body frame.

10. The engine-supporting structure of claim 1, wherein the first collar is formed from sintered metal.

11. The engine-supporting structure of claim 1, wherein the first collar has a Brinell hardness in a range from 212–277.

12. A method of supporting an engine on a vehicle body frame of a motorcycle, said method comprising the steps of:
   a) inserting a first tubular collar comprising a substantially cylindrical body having opposed end faces between a first engine-supporting frame portion provided on the vehicle body frame and an engine case portion of an engine;
   b) interconnecting the first tubular collar, the frame, and the engine case portion by inserting a rod-shaped fastening member through respective holes formed in the engine-supporting frame portion and the first tubular collar, and into the engine case portion;
   wherein the collar is provided with an end surface comprising a flat surface portion, and a plurality of projections protruding outwardly from the flat surface portion, the projections provided to engage the engine-supporting frame portion or the engine case portion when an enlarged end of the rod-shaped fastening member abuts against the collar; and
   wherein the collar is formed of harder material than the material which forms the engine-supporting frame portion and the engine case portion.

13. The method of claim 12, further comprising the steps of:
   c) inserting a second tubular collar which is substantially identical to the first tubular collar between a second engine-supporting frame portion provided on the vehicle body frame and the engine case portion of the engine; and
   d) interconnecting the second tubular collar, the frame, and the engine case portion by inserting a second rod-shaped fastening member through respective holes formed in the second engine-supporting frame portion and the second collar, and into the engine case portion.

* * * * *